US008265993B2

(12) United States Patent
Chien et al.

(10) Patent No.: US 8,265,993 B2
(45) Date of Patent: *Sep. 11, 2012

(54) SYSTEM AND METHOD FOR USING LOYALTY REWARDS AS CURRENCY

(75) Inventors: Emily Chien, New York, NY (US); Trish Sanchez, Highland Park, NJ (US); Daniela Saunders, New York, NY (US); Jill Wiseman, New York, NY (US); C. R. Balagopal, Litchfield Park, AZ (US); Al Kinderknecht, Scottsdale, AZ (US); Jon W. Parson, Mesa, AZ (US); Ray Preston, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,198

(22) Filed: Sep. 23, 2011

(65) Prior Publication Data
US 2012/0035998 A1    Feb. 9, 2012

Related U.S. Application Data

(63) Continuation of application No. 09/834,478, filed on Apr. 13, 2001, now Pat. No. 8,046,256.

(60) Provisional application No. 60/197,296, filed on Apr. 14, 2000, provisional application No. 60/200,492, filed on Apr. 28, 2000, provisional application No. 60/201,114, filed on May 2, 2000.

(51) Int. Cl.
*G06Q 30/00* (2012.01)

(52) U.S. Cl. .................................................. 705/14.33
(58) Field of Classification Search .............. 705/14, 705/14.27, 14.28, 14.3, 14.33
See application file for complete search history.

(56) References Cited

U.S. PATENT DOCUMENTS

| 5,025,372 | A | * | 6/1991 | Burton et al. ............... 705/14.17 |
| 5,537,314 | A | | 7/1996 | Kanter |
| 5,689,100 | A | | 11/1997 | Carrithers et al. |
| 5,774,870 | A | * | 6/1998 | Storey ........................ 705/14.27 |

(Continued)

FOREIGN PATENT DOCUMENTS
WO    0101282    1/2001

OTHER PUBLICATIONS

USPTO; Office Action dated Sep. 27, 2011 in U.S. Appl. No. 11/161,906.

(Continued)

*Primary Examiner* — Dennis Ruhl
(74) *Attorney, Agent, or Firm* — Snell & Wilmer L.L.P.

(57) ABSTRACT

The present invention involves spending loyalty points over a computerized network to facilitate a transaction. With this system, a loyalty program participant is able to use an existing transaction card to purchase an item over a computerized network, while at the same time offsetting the cost of that transaction by converting loyalty points to a currency value credit and having the credit applied to the participant's financial transaction account. Currency credit from converted loyalty points may also be applied to stored value cards, online digital wallet accounts and the like. Further, currency credit may also be applied to other accounts to effect a gift or donation.

18 Claims, 17 Drawing Sheets

U.S. PATENT DOCUMENTS

| | | | |
|---|---|---|---|
| 6,222,914 | B1 | 4/2001 | McMullin |
| 6,898,570 | B1 | 5/2005 | Tedesco et al. |
| 7,025,674 | B2 | 4/2006 | Adams et al. |

OTHER PUBLICATIONS

USPTO; Office Action Restriction dated Oct. 11, 2011 in U.S. Appl. No. 12/338,621.
USPTO; Notice of Allowance dated Nov. 17, 2011 in U.S. Appl. No. 11/382,638.
USPTO; Notice of Allowance dated Jul. 12, 2011 in U.S. Appl. No. 09/834,478.
USPTO; Final Office Action dated Apr. 29, 2011 in U.S. Appl. No. 09/834,478.
USPTO; Office Action dated Nov. 15, 2010 in U.S. Appl. No. 09/834,478.
USPTO; Advisory Action dated Feb. 26, 2010 in U.S. Appl. No. 09/834,478.
USPTO; Final Office Action dated Nov. 24, 2009 in U.S. Appl. No. 09/834,478.
USPTO; Office Action dated Jun. 24, 2009 in U.S. Appl. No. 09/834,478.
USPTO; Advisory Action dated Apr. 22, 2009 in U.S. Appl. No. 09/834,478.
USPTO; Final Office Action dated Dec. 29, 2008 in U.S. Appl. No. 09/834,478.
USPTO; Office Action dated Jun. 2, 2008 in U.S. Appl. No. 09/834,478.
USPTO; Advisory Action dated Feb. 25, 2008 in U.S. Appl. No. 09/834,478.
USPTO; Final Office Action dated Nov. 7, 2007 in U.S. Appl. No. 09/834,478.
USPTO; Office Action dated May 10, 2007 in U.S. Appl. No. 09/834,478.
USPTO; Advisory Action dated Mar. 2, 2007 in U.S. Appl. No. 09/834,478.
USPTO; Final Office Action dated Dec. 28, 2006 in U.S. Appl. No. 09/834,478.
USPTO; Office Action dated May 9, 2006 in U.S. Appl. No. 09/834,478.
USPTO; Advisory Action dated Jan. 9, 2006 in U.S. Appl. No. 09/834,478.
USPTO; Final Office Action dated May 11, 2005 in U.S. Appl. No. 09/834,478.
USPTO; Office Action dated Nov. 29, 2004 in U.S. Appl. No. 09/834,478.
Written Opinion dated Mar. 13, 2002 in Application No. PCT/US2001/012219.
International Search Report dated Jan. 10, 2002 in Application No. PCT/US2001/012219.
International Preliminary Examination Report dated Dec. 12, 2005 in Application No. PCT/US2001/012219.
Fallon: "UK Retailers' Loyal Customer 'Card Wars' Prove Costly (Most major retailers in the UK have grown their sales over the past 2 years by launching loyalty-card programs)"; Supermarket News, May 5, 1997; vol. 47, No. 18, p. 57.

* cited by examiner

SPORTS.COM ONLINE
FILE EDIT VIEW FAVORITES TOOLS HELP
PAYMENT PAGE
ADDRESS http://SPORTS.COM

CHECKOUT
1 SKATEBOARD

AMOUNT
$250

PAYMENT INFORMATION

CREDIT CARD TYPE  AMERICAN EXPRESS
CREDIT CARD NUMBER  0000 001111 11111
EXP. DATE  4/02

CHARGE STATEMENT

JOSEPH E. EXAMPLE
0000 001111 11111

| SNOWBOARD SPORTS.COM | +250 |
| LOYALTY CREDIT RE: SPORTS.COM | -250 |
| AMT. OWED | 0 |

FIG. 10

CHARGE STATEMENT

JOSEPH E. EXAMPLE
0000 001111 11111

SNOWBOARD                    +250
    SPORTS.COM

LOYALTY CREDIT               -100
    RE: SPORTS.COM
                             ____
        AMT. OWED             150

FIG. 11

SPORTING GOODS

- NOW YOU CAN USE MEMBERSHIP REWARDS POINTS FOR YOUR ONLINE PURCHASES. HOW DOES IT WORK?
- HOW MANY MEMBERSHIP REWARDS POINTS ARE IN MY ACCOUNT?

YOUR SEARCH WITH EXPRESS SHOPPER:SPORTING GOODS:SNOWBOARD
RETURNED 34 ITEMS!

CLICK MODIFY SEARCH TO NARROW YOUR RESULTS

SHOP ONLINE • FIND IT LOCALLY

PAGES: 1 2 NEXT →

SORT BY:

| PRODUCT | MERCHANT | BRAND | PRICE | MEMBERSHIP REWARDS POINTS |
|---|---|---|---|---|
| K2 98-99 DOUBLE WIDE SNOWBOARD | SHOPSPORTS.COM | K2 | $249.99  [BUY IT]  PURCHASE THIS ITEM | 49,998 POINTS  [REWARDS]  USE POINTS TO PURCHASE |
| K2 98-99 DOUBLE WIDE SNOWBOARD FOR ENTRY TO EXPERT RIDERS, MEN'S SIZE 10 AND UP. BEFORE THE DOUBLE WIDE THERE WAS NOTHING IN THIS PRICE CATEGORY FOR BIG FOOTERS AND THERE'S STILL NO REAL COMPETITION. THIS YEAR THE DOUBLE WIDE GOES TO A... SHIPPING: $19.38  NARROW THESE RESULTS TO: SPORTING GOODS:INDIVIDUAL SPORTS:SNOWBOARDING:SNOWBOARDS | | | | |
| SANTA CRUZ T SNOWBOARD | SHOPSPORTS.COM | SANTA CRUZ OPERATION | $299.99  [BUY IT]  PURCHASE THIS ITEM | 59,998 POINTS  [REWARDS]  USE POINTS TO PURCHASE |
| SANTA CRUZ T SNOWBOARD SANTA CRUZ 2000 T FREERIDE SNOWBOARD FEATURES:*INFLUENCED BY THE BOARDCROSS MACHINE, BERTRAND DENERVAUD, AND BUILT FOR SUPER TECHNICAL FREERIDING, TREES, STEEPS AND POWDER. *AGGRESSIVE, LIGHTWEIGHT AND WON'T SHUT DOWN IN THE... SHIPPING: $17.83  NARROW THESE RESULTS TO: SPORTING GOODS:INDIVIDUAL SPORTS:SNOWBOARDING:SNOWBOARDS | | | | |
| SANTA CRUZ X SNOWBOARD | SHOPSPORTS.COM | SANTA CRUZ OPERATION | $339.99 | 67,998 POINTS |

FIG. 12B

SYSTEM AND METHOD FOR USING LOYALTY REWARDS AS CURRENCY

CROSS-REFERENCE TO RELATED APPLICATIONS

This invention is a continuation of, and claims priority to, U.S. Ser. No. 09/834,478 filed Apr. 13, 2001 and entitled "SYSTEM AND METHOD FOR USING LOYALTY REWARDS AS CURRENCY, now U.S. Pat. No. 8,046,256." The '478 application claims priority to, and the benefit of, U.S. provisional applications: (1) Ser. No. 60/197,296, filed Apr. 14, 2000, (2) Ser. No. 60/200,492, filed Apr. 28, 2000, and (3) Ser. No. 60/201,114, filed May 2, 2000. All of which are hereby incorporated by reference.

FIELD OF INVENTION

This invention relates generally to a method and system for spending loyalty points from a participant's loyalty account by converting the loyalty points to a currency credit and posting the credit to a second account, where the second account is generally a financial transaction account, such as a charge card, that is used to facilitate a transaction.

BACKGROUND OF THE INVENTION

Traditional loyalty (e.g., incentive award, frequency reward, etc.) programs have been around for years. Loyalty programs are typically used to help businesses develop and maintain participant loyalty and are used as marketing tools to develop new clientele. A frequent flyer program is an example of a typical loyalty program, where the more the participant uses a particular airline or group of affiliated airlines the more frequent flyer miles the participant earns. After accumulating frequent flyer miles, the participant may choose to redeem those miles for upgrades in service or free airline tickets. Various forms of these programs have developed over the years, ranging from programs such as "buy 9 get one 1" punch cards to more sophisticated credit card loyalty systems, where participants are awarded points for using a particular transaction card and/or by using a transaction card with particular merchants or vendors. As competition in various markets increased, companies sought ways to expand loyalty programs to appeal to a broader cross-section of potential customers. One way this was accomplished was by developing strategic partnerships and affiliations with other business sectors. For example, hotel chains, airlines and rental car agencies developed loyalty program partnerships and affiliations; credit and transaction card companies also joined in to promote a more comprehensive and appealing loyalty program. These programs have been successful, but again were limited in that the loyalty points could only be redeemed within the network of companies in the loyalty program affiliation or partnership. For example, U.S. Pat. No. 5,937,391 ('391) owned by Fujitsu Limited; U.S. Pat. Nos. 5,774,870 ('870) and 6,009,412 ('412) owned by Netcentives, Inc.; and U.S. Pat. No. 5,025,372 ('372) owned by Meridian Enterprises (all of which are hereby incorporated by reference) illustrate recent efforts to create more attractive loyalty systems.

The '391 patent is directed to an improved method of accumulating, managing, and redeeming points with a point-service system in an online shopping mall established through a network. This system utilizes point accumulation and points redemption ratios based on particular vendors in order to vary the amount of points awarded and the value of points redeemed. This system is limited, however, to a participating network of vendors that accept redemption of points for product, i.e., this system is not compatible with merchants who do not accept points and are not integrated into a shopping mall. This system is also directed to managing, within a network of participating vendors, the accumulation of points from one vendor (with a particular accumulation ratio) and redemption of points with another vendor (with another redemption ratio).

The '870 and '412 patents both relate to an online, interactive frequency and award redemption program which immediately awards and issues bonus points to a user's awards account in response to that user's online purchase of merchandise. In other words, submission of a purchase order form during an online session results in the calculation and addition of points to an enrolled user's account as well as the display of current account information. The user is then immediately permitted to redeem any or all of the award points in the user's account, including currently awarded points, in that same online session. This system is specifically directed to expediting the award and redemption of points for product. Therefore, this invention is limited to redeeming points within a redemption network of merchants who accept points.

The '372 patent generally relates to an incentive award program which allocates monetary amounts of credit based on a participant's performance of a designated level of achievement. The monetary amounts can be withheld and/or adjusted by a sponsoring company. Although this system allows for the crediting of a monetary value to a credit instrument, it is limited in that the participant is not able to interact over a computerized network with this system so as effect a real-time transaction or to effect a real time credit to a credit instrument.

Although many of these programs have been successful in developing customer loyalty and incenting customers to act, they have presented participants with limited opportunities to redeem loyalty points for the products of their choice or have provided participants with limited accessibility and control of their loyalty account. Therefore, a need exists in this industry for a program that expands product choice for loyalty program participants, while offering better real-time control of one's account.

SUMMARY OF THE INVENTION

In general, the present invention overcomes the limitations and problems of the prior art by providing a system and method for facilitating virtually any transaction over a computerized network using any type of loyalty program. This system is not limited to merely exchanging loyalty points for product. In an exemplary embodiment of the present invention, a participant desiring to apply loyalty points to facilitate a particular transaction over a computerized network such as the interne: (1) uses his or her charge card number to make an online purchase, (2) associates the charge card account with a loyalty account; and (3) invokes a process to apply a currency value credit (corresponding to a defined amount of loyalty points) to the participant's designated charge card account. This currency value credit may offset all or part of a corresponding purchase. Therefore, loyalty points are not used to make the purchase, but may be used to offset at least part of a corresponding charge. The integration of the loyalty program and existing transaction (e.g., charge card) account processing systems is generally transparent to the merchant in that the merchant may be unaware that the customer is using loyalty points by offsetting at least part of the charge with a corresponding credit. Additional embodiments relate to the crediting of a variety of different accounts to facilitate particular transactions.

The present invention may or may not be integrated into a merchant or shopping network. The integrated embodiment of this invention ("the integrated system") provides for an explicit and known relationship or interface between (1) a merchant or group of merchants (i.e., shopping or redemption network or gateway) and (2) the account manager (the loyalty program host system). The non-integrated embodiment ("the stand-alone system"), allows the systems and methods of the present invention to function independently of the merchant network, where the participant may choose to redeem loyalty points for a currency equivalent credit without regard to a particular merchant, a network of merchants or a corresponding transaction. For example, a participant possessing a card provider A's (or account manager's) charge card and participating in an affiliated loyalty program, may use loyalty points to facilitate a transaction with any merchant that accepts card provider A's charge card.

An exemplary system and method of the present invention is generally described herein, in terms of a transaction phase, a transaction authorization and settlement phase, and an account reconciliation phase. During the transaction phase, a loyalty program participant desiring to spend accumulated loyalty points generally selects products or services for purchase from an individual merchant or a shopping/redemption network of merchants. For example, in an online transaction, the participant may select a "pay with loyalty points" hyperlink button, thereby invoking a process to convert accumulated loyalty points to some currency value such as a credit to a participant's financial transaction account. After selecting a given product or service to purchase, the participant provides his or her transaction card number and the transaction is processed as with any other transaction. Additionally, in one embodiment, before the transaction is allowed to go forward, the account manager verifies that sufficient credit is available on participant's financial transaction account and/or sufficient loyalty points are available in participant's loyalty account. In this case, a charge authorization system is accessed to compare the transaction details with account information stored in the participant's loyalty account and the participant's transaction account.

During this verification process, the account manager's loyalty system middleware determines the appropriate number of loyalty points to use by implementing a conversion processor that converts the participant's loyalty points to an appropriate currency equivalent (e.g., 100 loyalty points=$1 US). For example, taking into account the 100 to 1 conversation ratio, if the transaction amount is $100.00, the loyalty point equivalent would be 10,000 points. If the participant confirms the use of designated loyalty points to complete the purchase, the participant's loyalty account is reduced by the appropriate number of loyalty points and the merchant proceeds with the transaction authorization and settlement phase to complete the transaction.

Additional exemplary embodiments relating to the transaction phase contemplate, inter alia, (1) use of a temporary account number ("secondary transaction number") instead of a physical transaction card number, (2) integration of a shopping or third party redemption network, (3) integration with external loyalty programs or commercial transaction networks, (4) redemption and conversion of loyalty points for gift products or charitable donations, (5) redemption and conversion of points without a corresponding purchase, e.g., for cash or statement credit, (6) transfer of loyalty points from one party to another, (7) transfer of loyalty points to different transaction instruments or consolidating points onto a single transaction instrument.

Further, the transaction phase may occur over any computerized network via any suitable user interface system (e.g., interne, phone, wireless, POS terminal, etc.). As used herein, the term "computerized network" includes, but is not limited to any network implemented in the form of a wire-based network (including telephone and cable lines), or as a wireless network (including satellite or cellular networks). It should be noted that the conversion ratio may vary from merchant to merchant according to the merchant's affiliation, if any, with the loyalty program or account manager. Through the loyalty system middleware conversion application, the account manager may adjust conversion ratios to take into account various promotional or incentive marketing programs in order to better serve the needs of its participants or affiliated merchants. By further example, if the account manager desired to run a promotional program with a valued merchant, the conversion ratio for using loyalty points at the valued merchant (10 loyalty points=$1 US) may be twice the amount for that of an ordinary merchant (20 loyalty points=$1 US).

As with traditional purchases using transaction cards, the transaction card details (e.g., transaction card number, expiration date, etc) are provided to the merchant or shopping network system to complete the transaction. The merchant then processes this transaction card number (and associated transaction details) for authorization and settlement as is generally done with routine transaction card purchases. The transaction authorization and settlement phase supports the processes of submitting a transaction record to the account manager (e.g., card provider or acquirer) for payment. A financial capture system captures the financial information and transaction details and sends this information to an accounts payable system to pay the merchant and to an accounts receivable system to update the participant's transaction card account record to reflect the transaction event and applicable charge.

During the account reconciliation phase, the accounts receivable system reconciles the charge for the particular transaction with a credit from the participant's loyalty account. In one embodiment, for each charge where the participant selected to pay with loyalty points, there will be a corresponding and offsetting charge to the account. In another embodiment, where the account participant desires to pay only part of the transaction amount with loyalty points, the loyalty credit will only partially offset the merchant charge and the remainder will be paid with the participant's transaction card. In a third embodiment, there may be a credit from a participant's loyalty account without a corresponding transaction charge, such as is the case with a gift certificate embodiment, where the points are converted to a currency credit and issued in the form of a gift certificate; or stored on or downloaded to a stored value card or smart card.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

FIGS. 3-9 are web page screen shots depicting an exemplary online embodiment of the present invention;

FIGS. 10-11 illustrate exemplary participant account statements reflecting merchant charges and offsetting loyalty credits;

FIGS. 12B-D are exemplary web page screen shots further illustrating the online flow diagram shown in FIG. 12A.

DETAILED DESCRIPTION OF EXEMPLARY EMBODIMENTS OF THE INVENTION

In general, the present invention uniquely integrates a loyalty program and the financial transaction systems of a transaction card provider ("account manager") to more effectively use loyalty points to facilitate transactions. Specifically, the system and methods described herein, allow an individual to convert loyalty points (such as points awarded to a participant in the American Express Membership Rewards® Program) to currency (e.g., U.S. dollar credit or some cash value equivalent) in order to facilitate a purchase or other transaction. This system not only provides a mechanism for converting loyalty points to a currency credit to purchase merchandise, but it also comprises existing account manager settlement systems such as accounts receivable and accounts payable processes to facilitate transaction processing.

Figure 1:
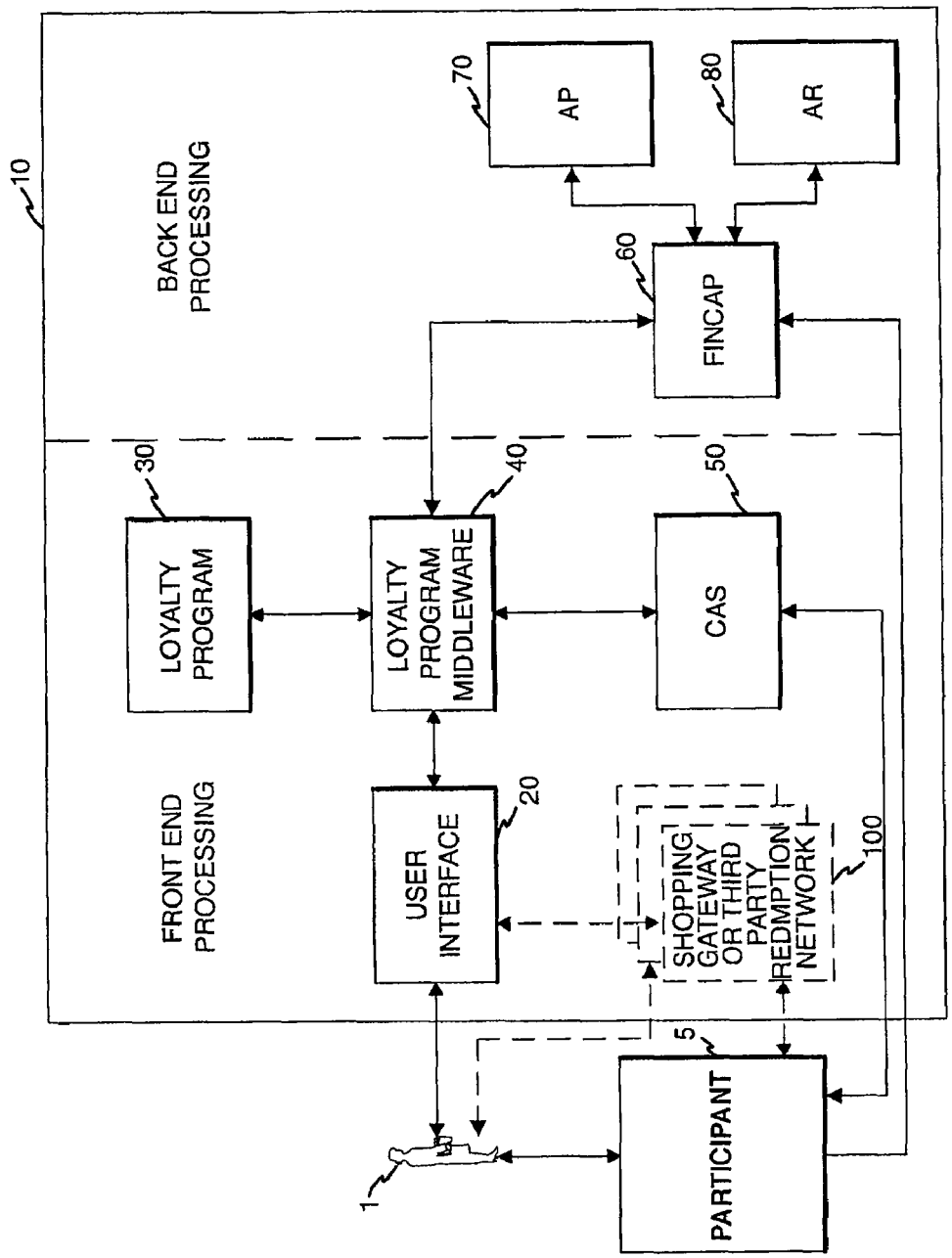
FIG. 1 illustrates exemplary components of the present invention.

FIG. 1 illustrates exemplary components of the present invention. To facilitate a transaction using loyalty points, a participant 1 engages a merchant 5 to purchase a product or service using currency credit generated by conversion of loyalty points. The merchant 5 need not be affiliated or partnered with any loyalty program, shopping network, or third party redemption system, although this arrangement is contemplated by an exemplary embodiment of this invention, as shown in FIG. 1 (shopping gateway or redemption network 100). Further, unlike traditional loyalty programs, the merchant 5 may not even be aware that the participant 1 is using loyalty points to facilitate the transaction because the merchant 5 processes the transaction using a participant's financial transaction account information just as with any other transaction where a transaction card number is used for payment. The account manager 10 handles the processes to convert the loyalty points to a currency-equivalent and to then credit the participant's financial transaction account with an amount that may offset a charge associated with a particular transaction. As depicted in FIG. 1, an exemplary system of the present invention may comprise various subsystems and applications, some of which are part of the loyalty program, some of which are part of the financial transaction account system, and some of which are used to facilitate interaction between the two systems. The exemplary systems are, inter alia, a User Interface System 20, a loyalty system middleware 40, a loyalty program 30, a card authorization system (CAS) 50, a financial capture system (FINCAP) 60, accounts payable (AP) 70 and accounts receivable (AR) 80 systems. The exemplary components and participants of the present invention are described below in more detail.

The participant 1, as used throughout this application, should be understood to mean any individual, business or other entity that desires to use any non-currency tender such as loyalty points to facilitate a transaction. The participant 1 may also be known as and occasionally referred to herein as a "customer," "cardholder," "user," "cardmember," or the like. In an exemplary embodiment, although the participant 1 may be an existing credit card holder, this is not required. Although the participant 1 will generally be enrolled in a loyalty program, such as the American Express Membership Rewards® Program, and will have accumulated loyalty points, this is also not required.

Although the non-currency tender referred to throughout this disclosure is frequently referred to as "loyalty points," this invention is not so limited. It should be understood the loyalty points includes any type of non-currency tender, such as coupons, frequent flyer miles, incentive awards, frequency awards, and the like. One example of loyalty points contemplated by this invention is the membership reward points awarded to participants in the American Express Membership Rewards® program.

The "merchant 5" is any individual, business or other entity who transacts with the participant 1, whether or not in exchange for goods or services. For example, in one embodiment, a merchant 5 may be an online bookstore such as Amazon.com®. In another embodiment, a merchant 5 may be a local hardware store utilizing a point of sale system. In other situations, the merchant 5 and the participant 1 may be the same. In other situations, the merchant 5 may be the same as the account manager 10. Although certain embodiments contemplate the merchant 5 being affiliated or partnered with a shopping network, as shown at 100 in FIG. 1, this is not required. Although referred to herein as "merchant," this term contemplates situations where any second party receives a form of currency from a first party, such as, for example, where a participant 1 gifts a product (e.g., gift certificate) containing a currency credit to another individual. For example, a participant 1 may desire to convert loyalty points to a currency-equivalent value to generate a gift certificate for use at a particular merchant 5.

The term "transaction" not only contemplates an exchange of goods or services for value from one party to another, but also the gifting of something of value from one party to another. This may be, for example, gifting of a merchant gift certificate as described above or gifting of loyalty currency from a first party account to another account. Additionally, transaction or transaction card numbers are account numbers that are used to facilitate any type of transaction. As used herein, a "transaction card" may include any account used for financial and/or loyalty transactions wherein the account may or may not be associated with a physical card, such as a charge card, credit card, debit card, smart card, bar-coded card, magnetic stripe card, account number, internet account, internet card, personal digital assistant account, digital wallet account, airline card, mall card, frequent shopper card, and/or the like.

The account manager 10 as defined herein includes any individual, business, or other entity; or group or affiliation of individuals, businesses or other entities, that facilitates the processes of the present invention. The account manager 40 may also be known as and occasionally referred to herein as "card provider," "card issuer," or the like. It should be appreciated that although FIG. 1 depicts the loyalty program 30, loyalty system middleware 40, CAS 50, FINCAP 60, AR 70, AR 80, User Interface 20 as contained within one account manager system, it should be appreciated that the account manager 10 may comprise many sub-components, sub-systems and/or a variety of business entities. While a closed-loop network as utilized by American Express® may contain many, if not all of the subsystems in FIG. 1, an open network system, such as VISA® and Mastercard®, may utilize various acquirer and issuer networks and components that make up the various systems in FIG. 1. One skilled in the art will appreciate that these systems may be one system, distributed systems or any other arrangement of systems in any form, such as software, hardware, etc. In short, the various subsystems described herein may be contained within one account manager 10 system or within the systems of many account managers 10.

Communication among the account participant 1, merchant 5, the account manager 10 or additional third parties (as may be contemplated by various embodiments) may take place over any computerized network via any suitable user interface system 20 that allow for the exchange of analog or digital information. As such, these systems may include, but are not limited to, telephone interactive voice response or operator-facilitated systems, online or offline computer networked systems using various transfer protocols, wireless devices, personal data assistants, interactive TV, broadband, ultrawide band devices, transponders and the like. For example, the user interface system may comprise web servers and applications configured to facilitate client/server communication over the interne via any wireless or wire-based system.

The loyalty program 30 may be any computer system for managing, tracking, and/or reporting loyalty program information. As previously described, the traditional loyalty systems allow participants to accumulate points in a loyalty program account and to then redeem points for merchandise. For example, the American Express Membership Rewards® system allows participants to accumulate points by using their transaction card (American Express® card) to make purchases or by shopping with affiliated merchants. The loyalty program 30, as contemplated by the present invention, may be a stand-alone system or may be affiliated or integrated with other loyalty programs or transaction networks. The component parts of an exemplary loyalty program 30 generally include computer server and database systems for processing and storing loyalty program account information. As depicted in FIG. 1, the loyalty program system may exist within the account manager's systems. Alternatively, the loyalty program system may be a separate loyalty program managed by a third party.

The loyalty system middleware 40 is a processing system that is generally configured to facilitate communication between the loyalty program 30, existing transaction card processing systems, and/or shopping/redemption networks. Specifically, the loyalty system middleware 40 is configured to, inter alia, (1) receive requests to use loyalty points as currency, via a user interface system 20, (2) verify with the loyalty program 30 that sufficient loyalty points are available, (3) communicate with an authorization system (e.g., CAS 50) to determine if the participant's 1 financial transaction account is active and has a sufficient credit limit, (4) convert loyalty points to currency, and (5) interact with financial capture (e.g., FINCAP 60) or accounts receivable (AR) 80 systems in order to credit a participant's financial transaction account with the appropriate amount of loyalty currency. The loyalty system middleware 40 may comprise various computer web and application servers, databases, routers, relays and the like in order to suitably process, route, and transmit data among, inter alia, the user interface system 20, loyalty program 30, FINCAP 60, and CAS 50.

The charge authorization system (CAS) 50, the financial capture system (FINCAP) 60, the accounts payable system (AP) 70 and the accounts receivable system (AR) 80 are known in the art systems employed by transaction card companies like American Express® and other card acquirers or card issuers to authorize merchant transaction requests and process settlement requests. While FIG. 1 shows these systems in one account manager system, it should be appreciated that these systems take various forms depending on the particular account manager or groups of account managers. For example, an exemplary CAS 50 receives an authorization request from a merchant 5 to determine if the financial transaction account associated with a transaction card number is valid and has sufficient credit. CAS 50 includes systems for comparing the transaction details (e.g., account number, monetary amount of transaction, expiration date, etc) with the participant's financial transaction account information to determine if the financial transaction account is active and if a sufficient credit limit exists to complete a transaction. If these conditions are satisfied, CAS 50 returns to the merchant 5 an approval code reflecting that the merchant 5 is authorized to complete the transaction. The loyalty system middleware 40 or loyalty program 30 may also either reference this same CAS 50 as shown in FIG. 1 to determine if the participant's loyalty account information is valid (and with sufficient loyalty points) or may invoke a separate CAS component (not shown) to complete the same task.

In an exemplary embodiment, upon completion of a transaction (or a series of transactions), the merchant 5 transmits a record of charges (ROC) and summary of charges (SOC) request to the card provider (referred to herein as the "account manager 10") requesting to be paid for the transaction. The ROC file generally contains transaction details which could include, inter alia, the merchant identification number, amount of purchase, date of purchase, and expiration date. This information is captured in the account manager's (e.g., charge card provider) financial capture system (FINCAP) 60 where it is processed for merchant 5 payment and cardholder (participant 1) billing. FINCAP 60 then sends a payment file to an AP 70 to pay the merchant 5, retrieves the appropriate participant 1 (e.g., cardholder) account information, and sends a billing file to an AR 80. The AR 80 generates a participant 1 billing statement that reflects the appropriate billing information such as date of charge, amount of charge, merchant, etc. As will be described in detail later, this invention contemplates the AR 80 receiving a credit from the loyalty system middleware 40 to appropriately offset at least a part of the merchant 5 transaction charge. Alternatively, as shown in FIG. 1, the loyalty system middleware may send credit requests to the FINCAP 60 for processing and forwarding to the AR 80.

Having described and defined exemplary components of this invention, it should be appreciated that the transaction system of the present invention may be described herein in terms of functional block components, flow charts, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that a network may include any system for exchanging data or transacting business, such as the Internet, an intranet, an extranet, WAN, LAN, satellite or wireless communications, and/or the like. The participant 1 may interact with the account manager's 10 (e.g., charge card provider) transaction system or a merchant 5 via any input device such as a telephone, keyboard, mouse, kiosk, personal digital assistant, touch screen, voice recognition device, transponder, biometrics device, handheld computer, personal data assistant (e.g., Palm Pilot®), cellular phone, web TV, web phone, blue tooth/beaming device and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention uses protocols such as TCP/IP to facilitate network communications, it will be readily understood that the invention could also be implemented using IPX, Appletalk, IP-6, NetBIOS, OSI or any number of existing or future protocols. Moreover, the system contemplates the use, sale, exchange, transfer, or any other distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

Communication between the parties (e.g., participant 1, account manager 10, and/or merchant 5) to the transaction and the system of the present invention may be accomplished through any suitable communication means, such as, for example, a telephone network, Intranet, Internet, point of interaction device (point of sale device, personal digital assistant, cellular phone, kiosk, etc.), online communications, offline communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described below with reference to block diagrams and flowchart illustrations of methods, apparatus (e.g., systems), and/or computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

This system may be integrated with other systems to better facilitate the spending of loyalty points and the conversion of loyalty points to a currency credit. For more information on loyalty systems, smart card systems, transaction systems, electronic commerce systems and digital wallet systems, see, for example, the Shop AMEX™ system as disclosed in Ser. No. 60/230,190 filed Sep. 5, 2000; a digital wallet system disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers disclosed in Ser. No. 09/800,461 filed on Mar. 7, 2001, and smart card systems disclosed in Ser. No. 60/232,040, filed on Sep. 12, 2000, and U.S. Pat. Nos.

5,742,845; 5,898,838 and 5,905,908, owned by Datascape, all of which are herein incorporated by reference.

Referencing the online aspect of an exemplary embodiment of this invention, each participant is equipped with a computing system to facilitate online commerce transactions. The computing units may be connected with each other via a data communication network. The network is a public network and assumed to be insecure and open to eavesdroppers. In the illustrated implementation, the network is embodied as the internet. In this context, the computers may or may not be connected to the internet at all times. For instance, the participant's computer may employ a modem to occasionally connect to the internet, whereas the account manager's computing center might maintain a permanent connection to the internet. It is noted that the network may be implemented as other types of networks, such as an interactive television (ITV) network.

The merchant 5 computer and the account manager 10 computer may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

Figure 2:
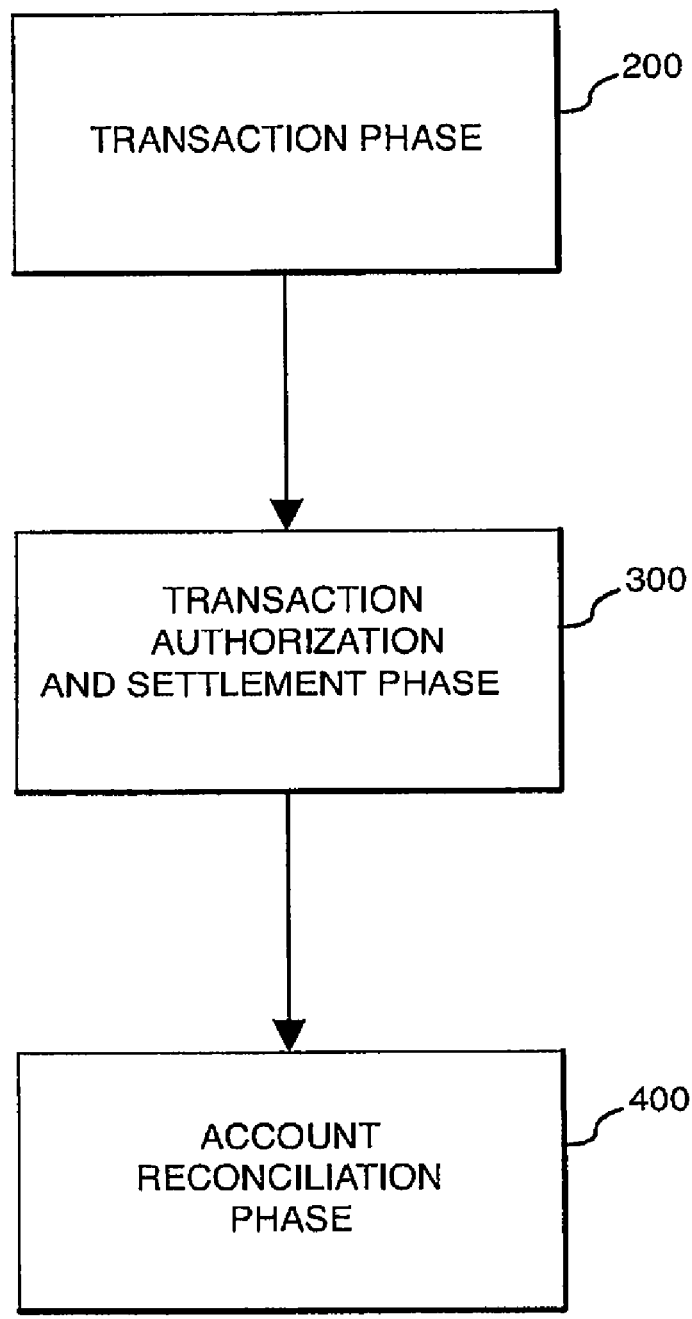
FIG. 2 illustrates an exemplary schematic overview of the various phases of the present invention.

Turning now to the methods for spending loyalty points by converting to a currency value credit, FIG. 2 illustrates three exemplary phases: (1) a transaction phase (step 200), (2) a transaction authorization and settlement phase (step 300), and (3) an account reconciliation phase (step 400).

Transaction Phase:

The transaction phase includes a participant's successful registration and enrollment to use the system and method of the present invention. In general, although not required, a participant 1 will have registered to participate in a loyalty program and will have accumulated at least some loyalty points. However, conducting the transaction before acquiring loyalty points is also contemplated by the invention. In an exemplary embodiment, the participant 1 has a transaction card associated with a financial transaction account (e.g., Discover® card, American Express card, etc.), wherein the card provider or loyalty program manager is what is referred to herein as the account manager 10. In an exemplary system, the account manager is both a card provider and a loyalty program manager. Registration and enrollment processes are known in the art, and as such, will not be discussed in-depth herein. Although an exemplary embodiment contemplates the use of, and integration of a participant's loyalty account and financial transaction account, other embodiments (e.g., the secondary transaction number embodiment, stored value card, gift certificate, etc (discussed later)) do not necessarily require this integration.

Figure 3:
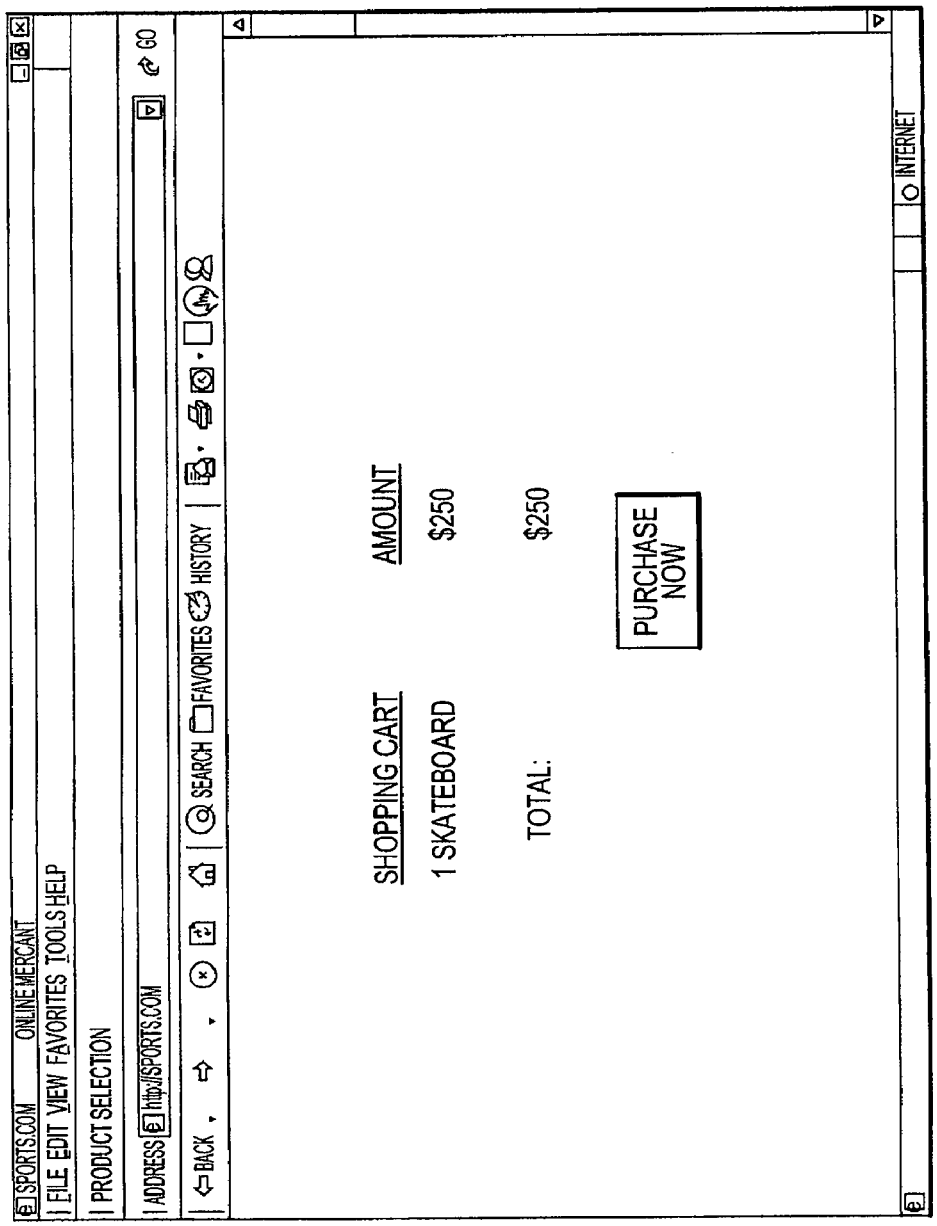
Figure 4:
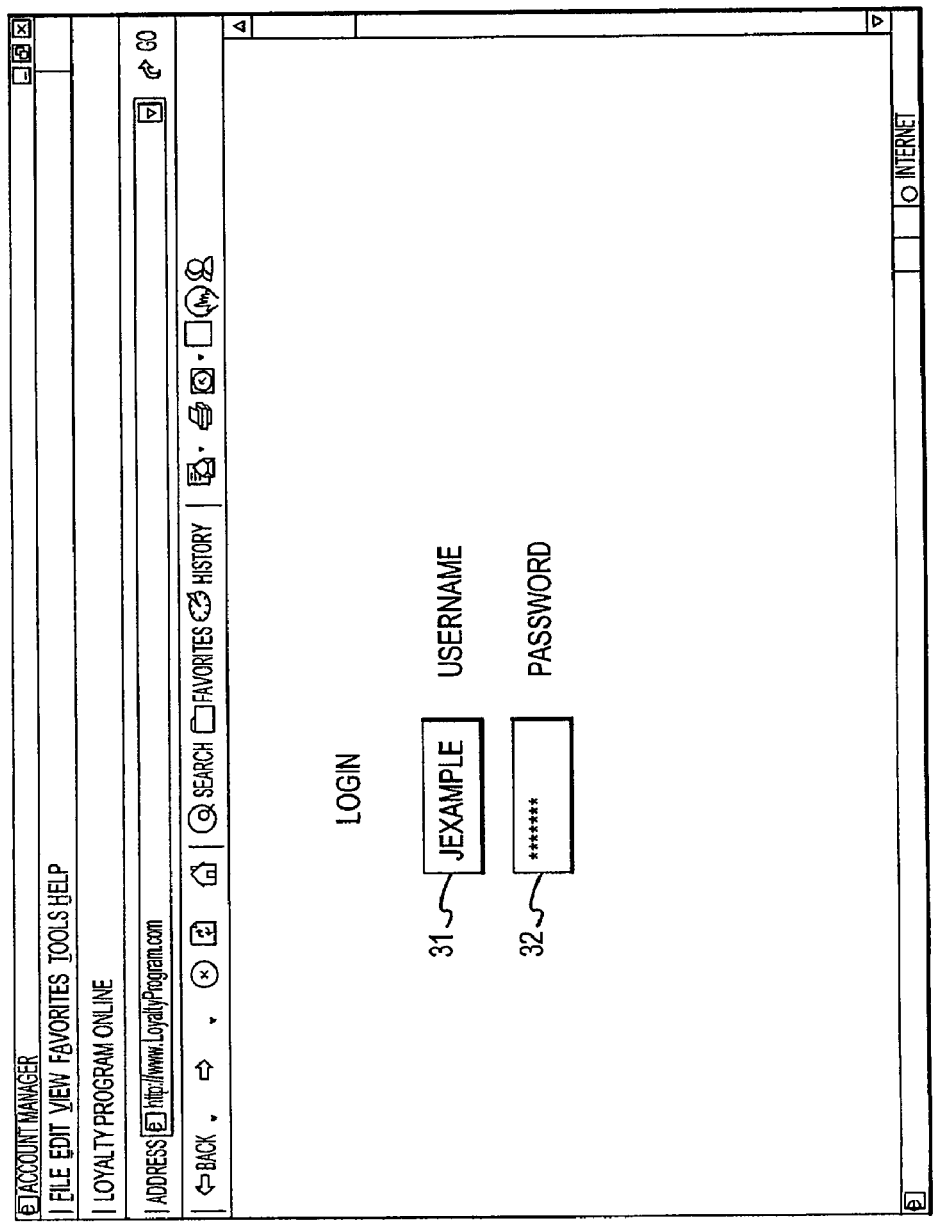

The transaction phase may be facilitated using an integrated (i.e., integrated with a shopping network) or stand-alone (i.e., not integrated with a shopping network) system. A stand-alone exemplary online embodiment is depicted in FIGS. 3-9. With additional reference to FIG. 1, these screen shots illustrate an exemplary embodiment of the present invention utilizing a user interface system 20 suitably configured with an appropriate web server system to facilitate online transactions. FIG. 3 shows a typical online merchant web page. Here, a participant 1 selects an item to purchase (e.g., a snowboard) from a merchant's online web page and selects the payment button. Desiring to use loyalty points, the participant 1 links to the account manager 10 website and logs-in with appropriate authenticating information such as a username and password (FIG. 4). As discussed later, in an alternative embodiment (the "integrated system"), the participant 1 may access a catalog of products and services offered by merchants by suitably linking to a website hosted on a redemption network, a shopping network or other system of affiliated merchants that may be situated within or without the account manager's website domain (see FIG. 12A-D depicting the integration of a shopping network within the account manager's system, wherein the account manager facilitates some or all of the transaction processing).

Figure 5:
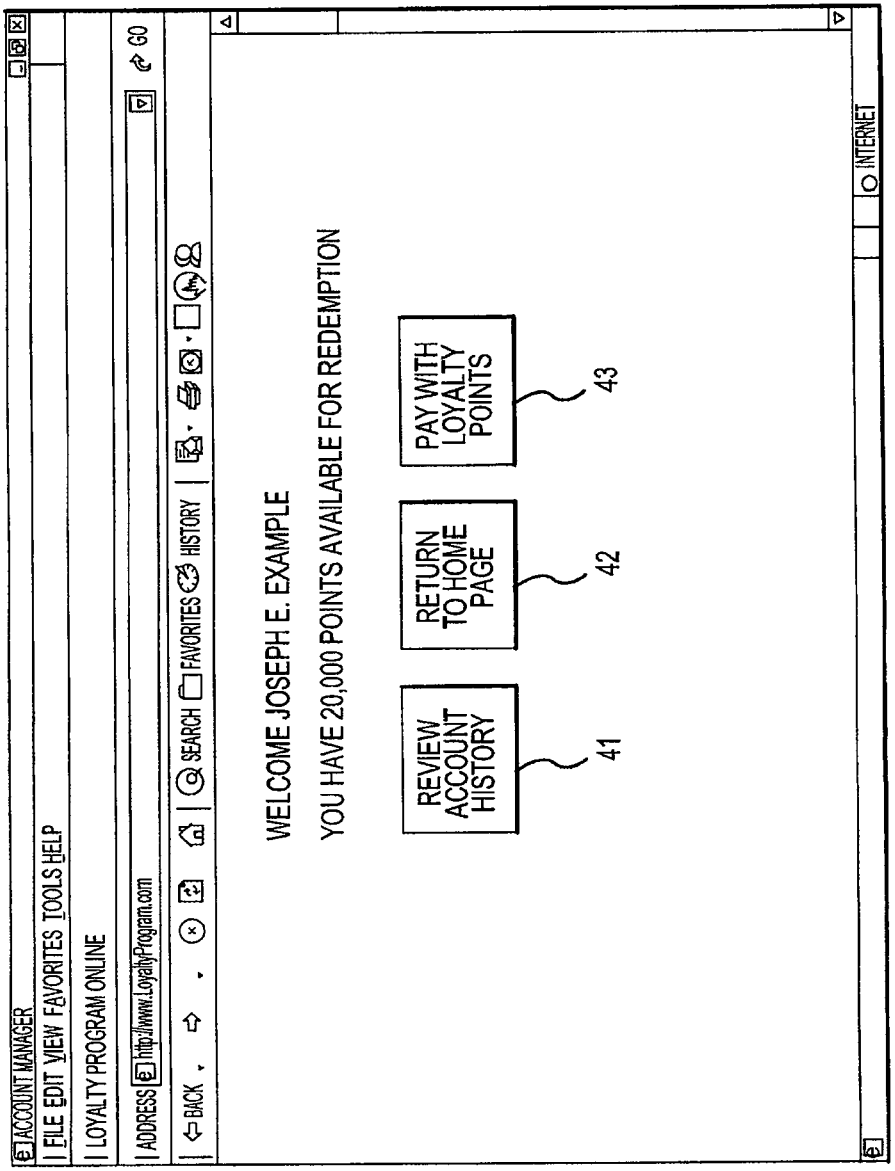
Figure 6:
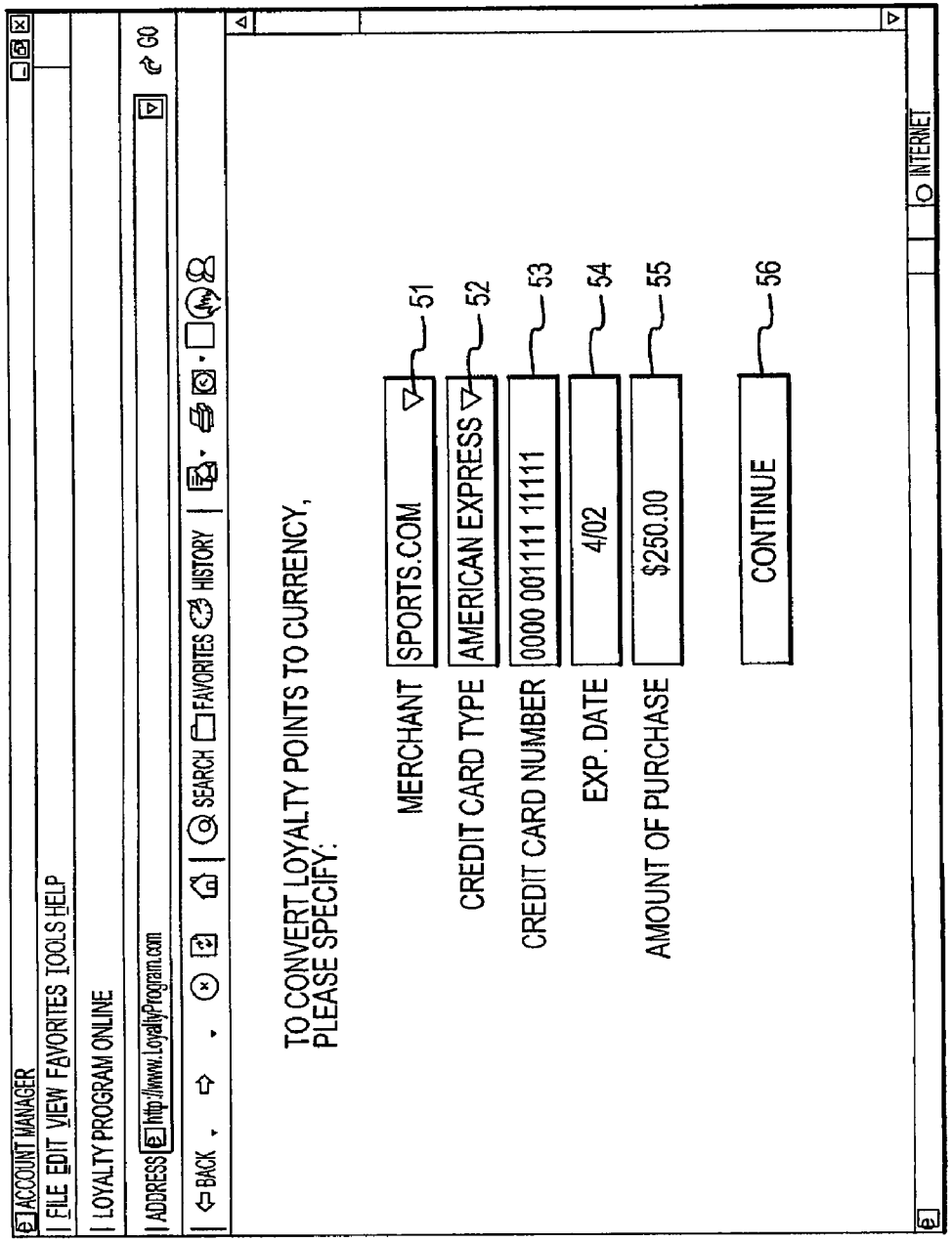
Figure 7:
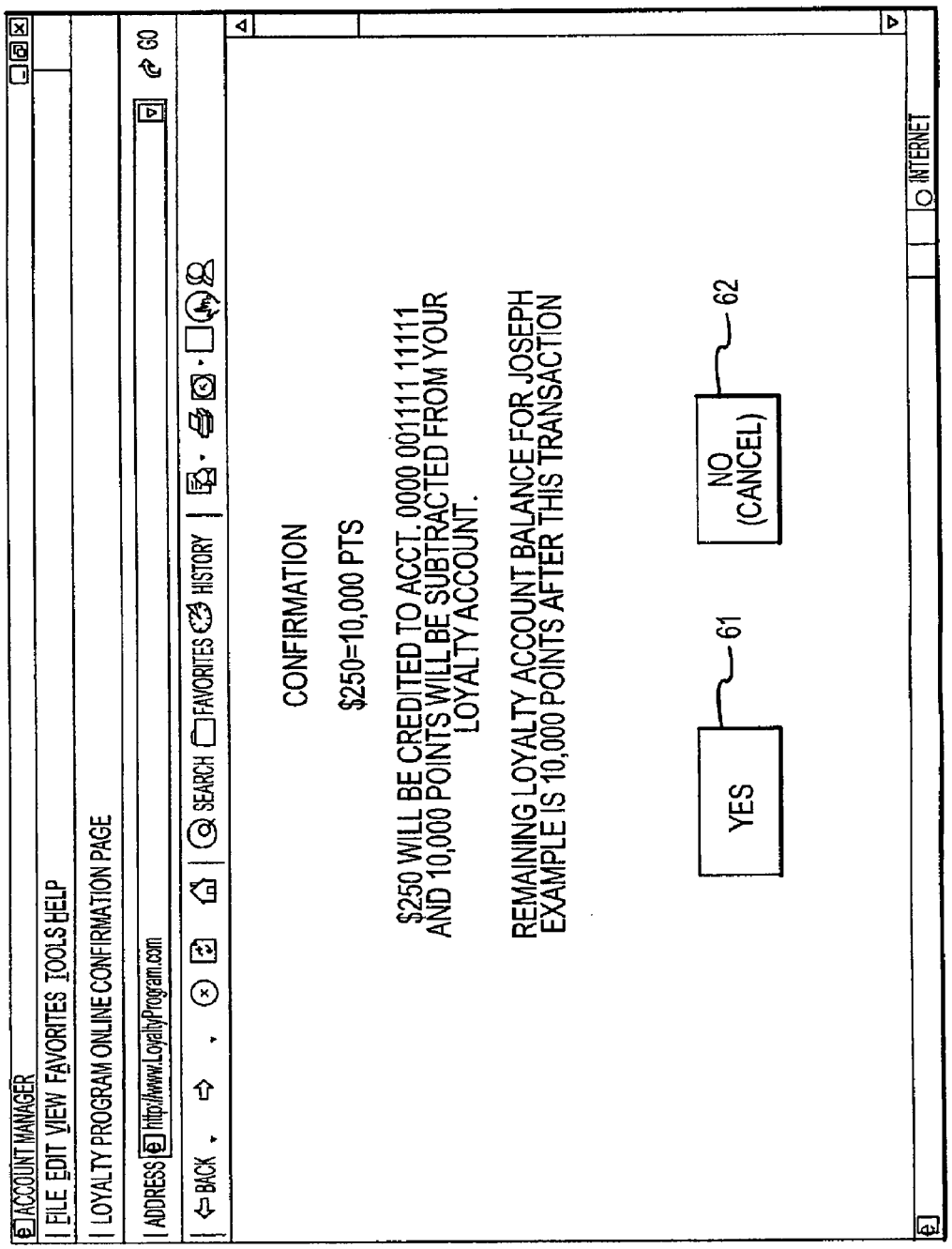

Continuing with FIG. 5, the account manager 10 website returns a welcome screen to the participant 1 (Joseph E. Example) reflecting participant's 1 loyalty account information, e.g., total points available. The participant 1 is presented with options, for example, to review the loyalty account history 41, to pay with loyalty points 43, to return to home page 42, etc. The participant 1 selects "pay with loyalty points" to initiate the process to convert loyalty points to the appropriate amount of currency to facilitate the transaction. As shown in FIG. 6, the loyalty program prompts the participant 1 to key in appropriate transaction account and transaction information, e.g., merchant 51, transaction card type 52, number 53, expiration date 54, amount of purchase 55. The merchant 51 field (or similar fields) may also include options for generating a gift certificate, charitable donations, etc. Further, software downloaded to a participant's remote computer may also provide digital wallet features that automatically fills-in payment and transaction field information.

Upon selecting the "continue" 56 option, referring again to FIG. 1, the loyalty system middleware 40 is generally configured to interface with CAS 50, which can be any form of an account authorization system or network, to validate the transaction request (i.e., to determine if the transaction card number is valid and if sufficient credit is available in the financial transaction account). If the transaction card is valid and sufficient credit is available, the loyalty system middleware 40 interfaces with the loyalty program 30 to calculate the appropriate number of loyalty points necessary to pay for the transaction (e.g., 10,000 points=$250) and to determine if sufficient loyalty points are available in the participant's loyalty program account. The participant 1 is presented with a confirmation screen (FIG. 7) confirming that the participant's 1 transaction account (e.g., acct. no. 0000 001111 11111) will be credited with the appropriate transaction amount (e.g., $250), while the participant's loyalty account will be reduced by the appropriate amount (e.g., 10,000 points). Although one embodiment contemplates updating the participant's loyalty account after the transaction has cleared, this updating can be done at any point in the process. Moreover, any portion of the process may utilize real-time or batch processing.

The conversion processor that preferably resides within the loyalty system middleware 40, may be programmed to take into account a plurality of factors to determine the appropriate conversion ratio of loyalty points to currency value. Accordingly, loyalty points accumulated by purchases involving a particular vendor may be converted at a higher ratio when the points are redeemed with the same vendor. Similarly, when purchasing with loyalty currency at an account manager's 10 valued or affiliated merchant, the account manager 10 may desire to provide the participant 1 with a higher conversion ratio to incent particular behavior. As one skilled in incentive marketing and loyalty systems will appreciate, there may be a multitude of variables that an account manager 10 and/or affiliated merchant 5 will want to consider in formulating appropriate conversion ratios, including different ratios for holidays, seasons, different times of days, based on remaining inventory of products, based on participant status, based on method of facilitating transaction (e.g., online vs. POS), and/or the like.

Figure 9:
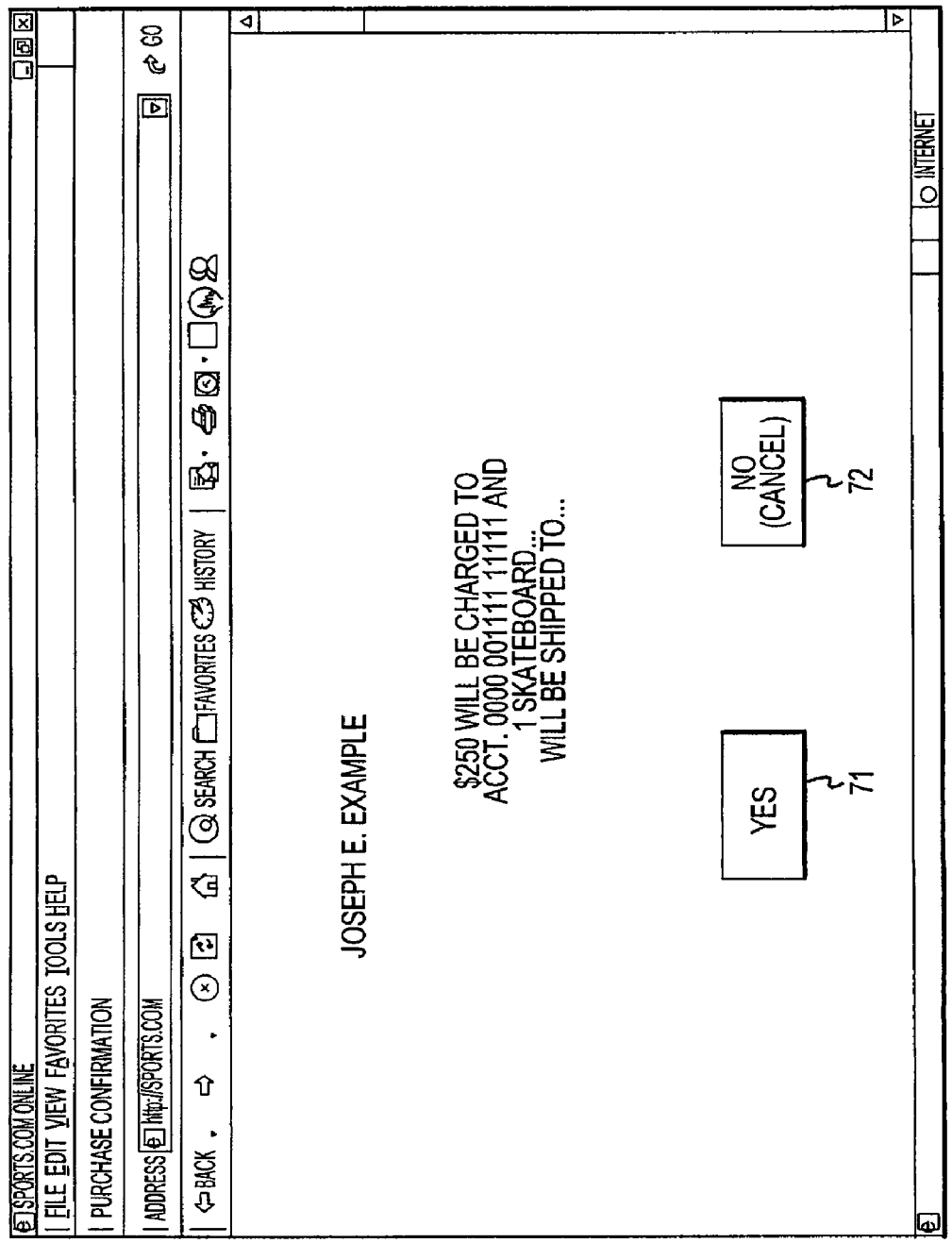

In an exemplary embodiment, after the conversion ratio and amount of loyalty points are presented to the participant 1, the participant 1 is provided the option to cancel 61 the "pay with loyalty points" request or approve the request 62. If the "pay with loyalty points" is selected, the participant 1 inputs the requisite payment information into the merchant 5 payment fields. FIG. 8 depicts a typical online merchant payment page where the participant is prompted for transaction account information to complete a purchase. FIG. 9 depicts an online merchant's confirmation page indicating that the transaction amount will be charged to the designated transaction card account (e.g., 0000 0011 11 11111). One skilled in the art will appreciate that any of the steps herein may be pre-selected by either party to provide automatic approval of certain steps or re-populate certain fields with repeated use information.

Additional online user interface embodiments for facilitating transactions provide for:

(1) the integration of the merchant 5 website with the account manager 10 website to provide a seamless environment and "look and feel" between the merchant's payment web page and the account manager's "pay with loyalty points" web page.

(2) the use of an online digital wallet, as described in U.S. Ser. No. 09/652,899 filed on Aug. 31, 2000 (incorporated herein by reference), where participant 1 account information is stored online and is integrable with the account manager 10 features and the online merchant's 5 payment features. In this embodiment an online wallet may be periodically loaded with loyalty points converted to a currency credit. The online wallet may or may not be associated with a participant's financial transaction account.

(3) the implementation of an activator feature that recognizes merchant payment websites during the course of a participant's online session (via an activator software program) and automatically generates a pop-up "pay with loyalty points" button (or window) asking the participant if he desires to pay with loyalty points. This activator program may be downloaded from the account manager's website and may be configured to link the participant to the account manager's website.

(4) using a wireless-enabled personal digital assistant (PDA), a browser enabled wireless telephone or other portable data device, a participant 1 may desire to convert loyalty points to a currency credit when making a purchase at a physical merchant 5 location instead of at a merchant's online website. With this system, using a suitably enabled PDA device, a participant 1 is able to scan SKU numbers of products, send these SKU numbers to the account manager 10, whereupon the account manager 10 identifies the manufacturer (or merchant) and may employ a suitable conversion ratio depending on the status of the merchant. For example, when shopping at a grocery market, a participant may scan all food items with a PDA device, this information is then transmitted wirelessly to the account manger 10, whereupon a conversion processor is invoked and applies a suitable conversion ratio depending on the particular manufacturer involved.

Transaction Authorization and Settlement Phase:

In an exemplary embodiment, the transaction authorization and settlement phase of the present invention is generally the same as traditional financial settlement systems and is well-known in the bank and transaction card industry. As such, the present invention contemplates minimal adjustments to existing commercial transaction card processing systems.

In general, after receiving transaction card information from a participant 1 to complete a purchase, the merchant 5 submits the information to an authorization network that typically includes a transaction card issuer's charge authorization system such as CAS 50 (FIG. 1). The CAS 50 verifies that the participant's transaction card is valid and the financial transaction account has sufficient credit. If the card number is authorized, the CAS 50 provides a merchant with an approval code. An alternate embodiment of this invention contemplates CAS 50 interacting with the loyalty system middleware 40 or directly with the loyalty program 30 to recognize that a loyalty currency credit is associated with the transaction details (e.g., transaction card number and purchase) and to verify that the loyalty account is valid and possesses sufficient credit.

Upon completing a transaction with participant 1, a record of charges (ROC) is generally created. Generally, after a given period of time (e.g., at the end of the day), the merchant 5 summarizes the transactions for that period in a summary of charges (SOC) and submits the ROCs and SOC to the transaction card provider or a card acquiring network (collectively referred to herein as the "account manager 10") for payment. A financial capture system (FINCAP) 60 receives the transaction details (ROCs/SOC) and processes the information for merchant 5 payment and participant 1 billing.

Account Reconciliation Phase:

As previously explained, the transaction details are forwarded to FINCAP 60 where a billing record is generated and sent to an accounts receivable (AR) system 80 to update the participant's 1 transaction card account and generate a billing statement. In one embodiment, the loyalty system middleware 40 forwards the appropriate credit to the FINCAP 60 or AR 80 systems to generate a credit to the participant's account. FIG. 10 reflects an exemplary billing statement excerpt reflecting the merchant charge (e.g., $250) and the corresponding loyalty program credit (e.g., $250). As previously mentioned, another embodiment allows the participant 1 to pay only part of the transaction amount with loyalty credit, in this instance, as depicted in FIG. 11, the participant 1 statement reflects that the charge is only partially offset and the participant 1 is billed for the remaining amount.

Upon completion of the account reconciliation (or at any point in the transaction event), the loyalty system middleware 40 interacts with the loyalty program 30 to permanently update the participant's loyalty account.

In an exemplary embodiment, the loyalty currency credit, the transaction details and the transaction card account may be associated within a transaction log database, a participant financial transaction account database, and/or a participant loyalty account database. This association between the transaction details, the participant transaction card account and the participant loyalty account facilitate customer service features that are common with transaction card use (e.g., a participant charge-back request and merchandise return, etc.), but have been previously unavailable to those redeeming loyalty points for product. For example, when a participant 1 desires to return a product (that has been purchased using loyalty points) to a merchant 5, the merchant 5 processes the return the same as with any other transaction card purchase, wherein the merchant 5 posts a credit to the participant's transaction card account. Alternatively, if desired, the FIN-CAP 60, upon accessing the transaction details, may recognize the transaction as involving a loyalty currency credit and may invoke the loyalty system middleware 40 to perform the appropriate conversion from currency credit back to loyalty points, and to adjust the participant's loyalty account accordingly. Similarly, during a dispute handling process where the participant 1 requests a charge-back to the merchant 5, the account manager's 10 customer service agent is able to retrieve data based on (1) transaction details, (2) transaction account information, or (3) loyalty account details. Accordingly, if a charge-back does occur, the loyalty system middleware 40 may be invoked to either credit the transaction account or adjust the amount of loyalty points in the loyalty account.

Figure 12A:
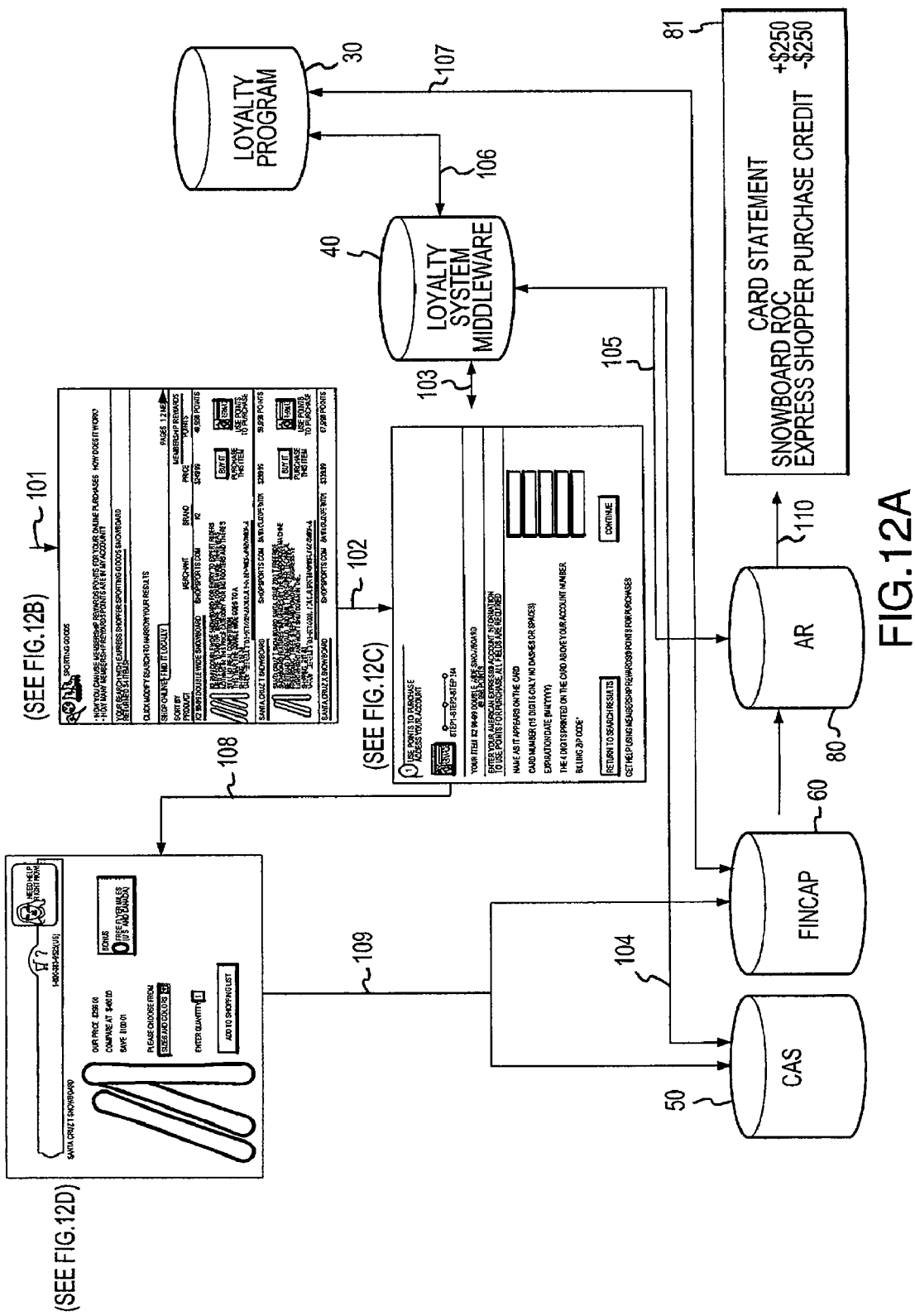
FIG. 12A is a flow diagram illustrating an exemplary online embodiment integrating a shopping network with the account manager's website.
Figure 12C:
Figure 12D:
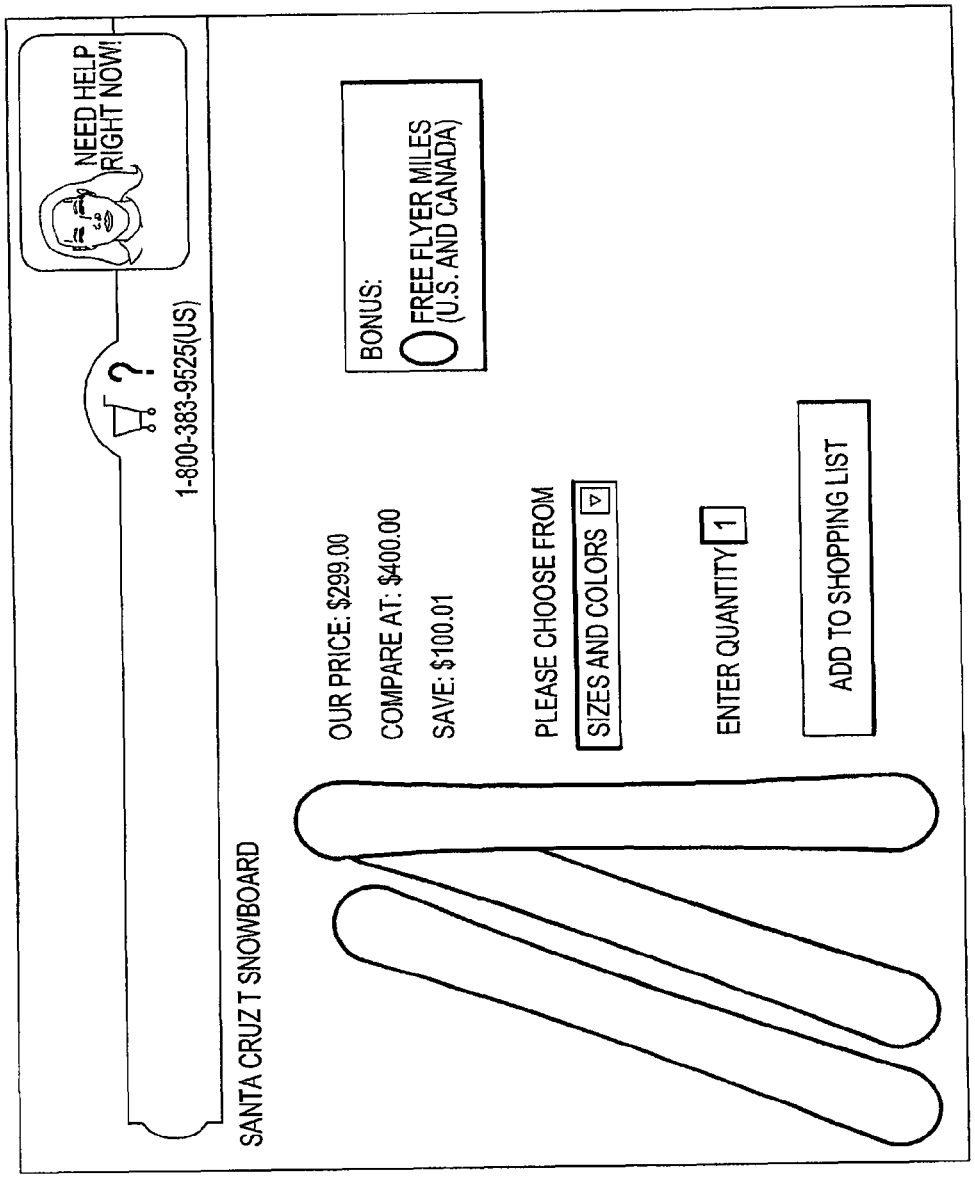

FIGS. 12A-D illustrate an online embodiment of the present invention utilizing a shopping gateway 100 (see also FIG. 1) that provides a comprehensive range of shopping functionality including connecting participants 1 with online merchants (via a gateway 100) and providing integrated search capabilities. This embodiment contemplates a network of merchants, affiliated with the account manager 10, that may be searched for a variety of products from within the account manager's 10 website (or alternatively on a co-branded or third-party website). Upon searching this comprehensive catalog of merchandise, and successfully retrieving a desired list of products to choose from, the server applications are suitably configured to present to the participant 1, inter alia, a list of the retrieved products, the associated merchant 5, and the cost in (i) currency (e.g., $249.98) and (ii) non-currency loyalty points (e.g., 49,998 points) (FIG. 12A, step 101; see also FIG. 12B, reference numbers 116-118). After choosing the "pay with points" button 115 (FIG. 12B), the web page shown in FIG. 12C is presented to the participant 1 (step 102) requesting the participant to enter name 121, card number 122, expiration date 123, four digit card control IP (CID) number 124, and billing zip code 125. As appreciated by one skilled in this art, a variety of fields may be configured depending on the type of transaction system used. As previously noted, to calculate the loyalty point value, the web server is configured to suitably engage the loyalty system middleware 40 (step 103), which in turn may access the CAS 50 (step 104), AR System 80 (step 105, and the Loyalty Program 30 (step 106) in order to verify that sufficient loyalty points and financial transaction account credit are available, and to calculate the number of loyalty points needed to complete the transaction. As shown in FIG. 12A, the loyalty program 30 (or alternatively the loyalty program middleware 40) converts the appropriate amount of loyalty points to a currency value and issues an appropriate credit to FINCACP 60 to be applied to the participant's financial transaction account (step 107). The merchant-specific website (FIG. 12D) is retrieved and the participant completes the transaction (step 108). The merchant 5 processes the transaction as with any other transaction card transaction (step 109) sending the transaction details first to CAS 50 to obtain an approval code and then compiling the ROCs/SOC for batch process transmission to the FINCAP 60 for payment. At FINCAP 60, the payment request is sent to an accounts payable system and the charge amount (e.g., $249.99) and loyalty credit (e.g., Express Shopper credit of $249.99) are sent to the AR system 80 for posting to the participant's billing statement (step 110).

Figure 13:
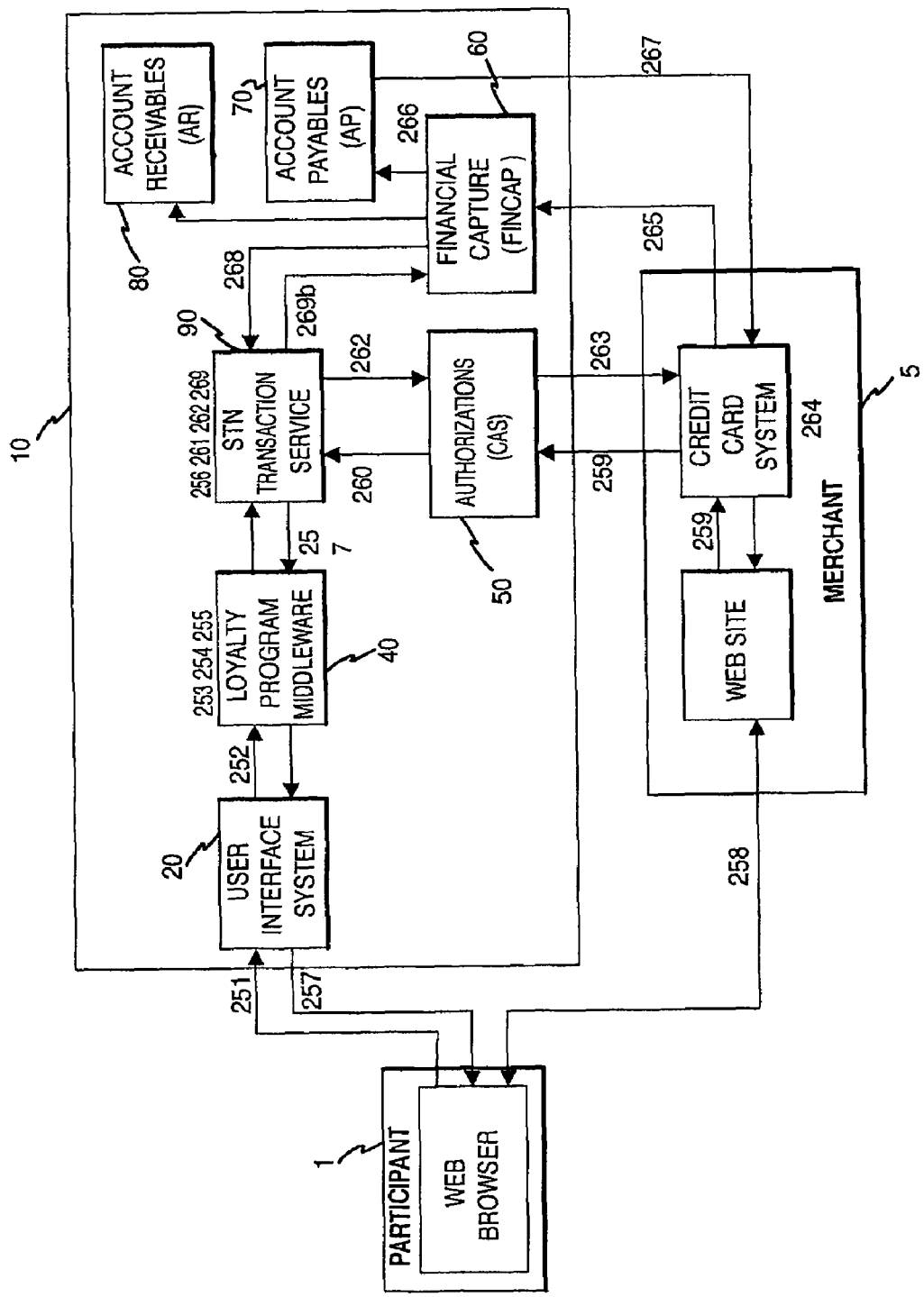
FIG. 13 illustrates an exemplary embodiment utilizing a secondary transaction number instead of a physical transaction card number.
Figure 14:
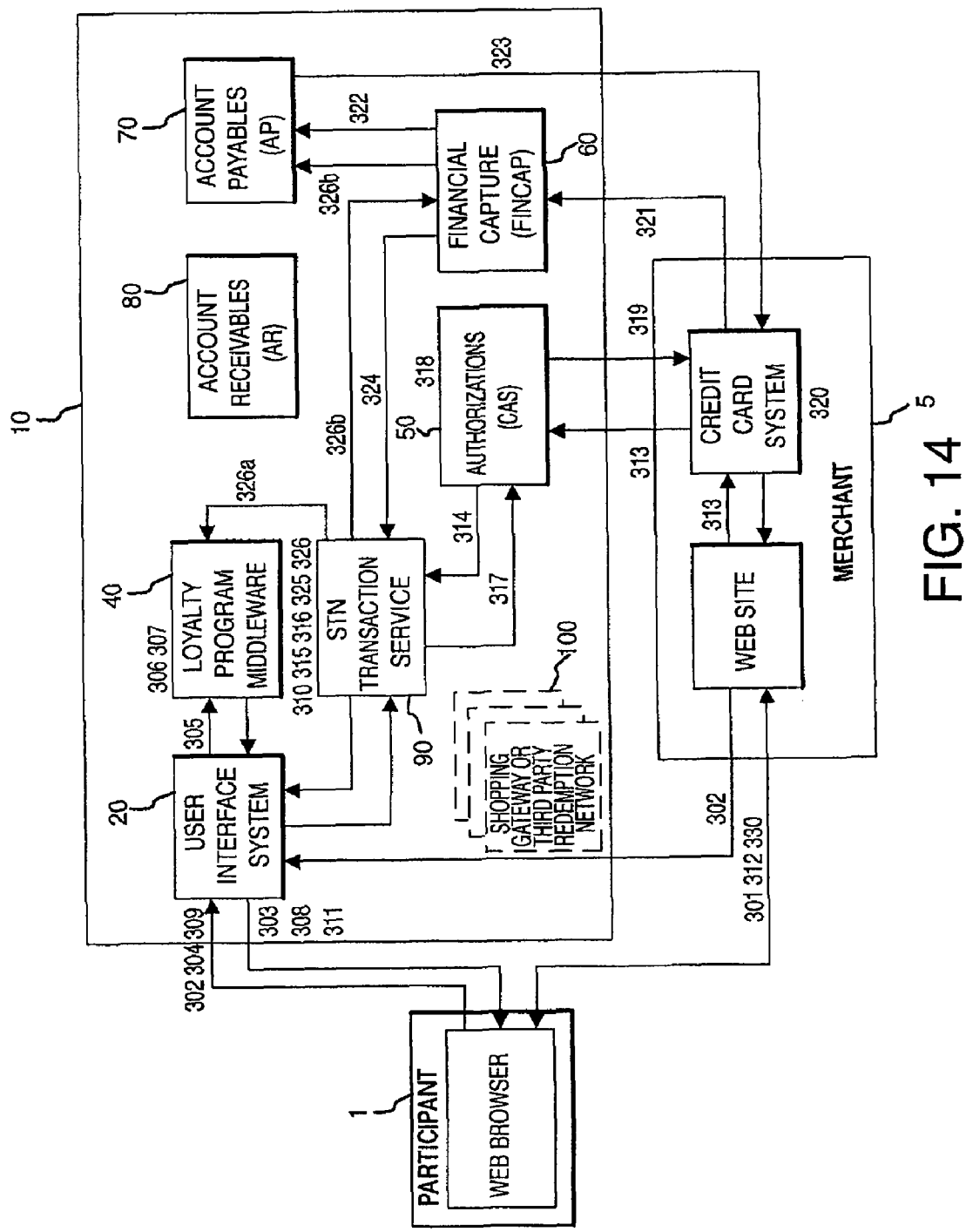
FIG. 14 illustrates a second exemplary embodiment utilizing a secondary transaction number instead of a physical transaction card number.

FIGS. 13 and 14 depict an embodiment of the present invention utilizing a secondary transaction numbers ("STN") instead of the participant's actual transaction card number. In general, a participant 1 seeking to purchase products from a merchant 5 may choose to use a temporary, limited use number in place of the participant's actual transaction card. This transaction may be more secure because the participant's actual transaction card number is not released to any third party. Here, a participant 1 may desire to obtain from the account manager 10 a limited or temporary use transaction number (STN) that functions as a standard transaction card (e.g., credit card) number but may be limited by the participant 1 to any number of defined conditions-of-use (e.g., limited number of transactions, limited dollar amount, specified merchant, etc.) limitations. For example, the secondary transaction number may be associated with, inter alia, a participant's actual transaction card account and/or a participant's loyalty account. The latter embodiment would allow a loyalty account participant to purchase using loyalty points as a currency value even without having an actual transaction card account. In other words, the secondary transaction number could function as a temporary transaction card account for use only in spending loyalty points. The secondary transaction number, however, in an exemplary embodiment, conforms to existing transaction card standards so that it may be processed with the banking authorization and settlement systems. For additional information on using secondary transaction numbers, see U.S. Patent application, System for Facilitating a Transaction, Breck et al, filed on Mar. 7, 2000, and related provisional applications disclosed in Ser. No. 60/187,620 filed Mar. 7, 2000, Ser. No. 60/200,625 filed Apr. 28, 2000 and Ser. No. 60/213,323 filed May 22, 2000.

FIG. 13 shows one embodiment using a secondary transaction number to facilitate a transaction using loyalty points. As depicted in FIG. 13, a participant 1 accesses and logs onto the account manager's 10 services via a user interface system 20 (e.g., an Internet connection) (step 251). The participant 1 proceeds (clicks on hyperlink) to the loyalty system middleware 40 (or alternatively directly to the loyalty program 30), where she indicates that she would like to use her loyalty points that are available in her loyalty account (step 252). The loyalty system middleware 40 reports to the participant 1 how much the available loyalty points are worth (step 253). The participant 1 indicates how many of the loyalty points (converted to currency) should be loaded into an account (e.g., financial transaction account) (step 254). In an exemplary embodiment, a secondary transaction number (generated by a STN transaction service 90) may be associated either with the participant 1 loyalty account alone or in combination with an existing participant's financial transaction account. Use of the loyalty account may be limited by the participant 1 or by the account manager 10, or could be further limited by the loyalty system middleware rules of use that may have been pre-defined by participating merchants 5 (step 255). Once the loyalty system middleware 40 has approved the request and allocated the requested loyalty points, the STN system 90 associates a STN and establishes an account profile that includes both the loyalty account and the secondary transaction account information (step 256) This information may be maintained on inter alia, a loyalty account database, transaction card database, or transaction log database. The STN system 90 returns the STN (and other account information) to the loyalty system middleware 40 to provide to the participant 1 for use in completing transactions (e.g., online purchases) (step 257).

When desiring to purchase products using the loyalty point-funded STN, the participant 1 proceeds to a merchant 5 site (e.g., online website), selects goods and is requested by the merchant 5 to provide payment information (e.g., via an online payment page such as shown in FIG. 8). The participant 1 chooses the appropriate card type or account manager (e.g., American Express, Visa, etc.) and enters the STN (and other necessary delivery and payment information) into the appropriate web page fields (step 258). The merchant 5 processes the STN authorization where the account manager CAS 50 recognizes the transaction as involving a STN (step 259), and forwards the request to the STN system 90 containing, inter alia, an application server and a STN database (step 260). It should be appreciated that the profile information may be stored in a loyalty program database, STN database, or any other suitable configurable data structure. The STN system 90 recognizes the account as a loyalty account, and verifies that optional conditions, if any, are met. If the conditions are not met, an error is returned to CAS 50 and then to the merchant 5 (step 261). If the conditions are met, the balance available on the loyalty account is reduced by the purchase amount, a record of the purchase is recorded on the loyalty account profile, and an approval code is returned to the authorization system (step 262) and then to the merchant (step 263). The approved purchase is finalized by the merchant 5 with the STN transaction being submitted through the merchant's existing point of sale (POS) network for settlement (step 264). The STN-loyalty transaction is received by the account manager FINCAP 60 (step 265). The FINCAP 60 forwards the STN-loyalty transaction to the appropriate AP 70 system (step 266). The AP 70 system then pays the merchant 5 according to the appropriate settlement terms and conditions (step 267). The FINCAP 10, having identified the transaction as involving a STN, sends the transaction information to the STN service 90 to identify the actual transaction card account (step 268). The STN service 90 recognizes that the STN is associated with a loyalty account, searches for the loyalty-STN profile and passes a credit request to the appropriate participant 1 loyalty account to (i) reduce the available loyalty points (step 269), and (ii) build a credit against the actual transaction card account that will offset the charged STN transaction (step 269*b*). In the first instance (step 269), the STN system 90 passes a request to the loyalty system middleware 40 to deduct the appropriate number of loyalty points. In the second instance (step 269*b*), both the original transaction charge and the loyalty credit are passed by to FINCAP 60 for normal billing processing. If the loyalty credit completely offsets the STN transaction charge, a zero balance may result. If the loyalty credit is less than the STN transaction amount, a participant 1 billing statement will be generated billing the participant 1 for the remaining amount.

In accordance with one embodiment, CAS 50 receives an authorization request for an authorization of a purchase transaction, via participant 1 at a second e-commerce website. The authorization request is associated with an account code that is issued by a first e-commerce web site for use on the second e-commerce website. In response to the authorization request, CAS 50 issues a challenge and forwards the challenge to participant 1. The challenge is passed to an intelligent token for processing and the intelligent token generates a response to the challenge. CAS 50 receives and processes the response from participant 1 and verifies the intelligent token. CAS 50 assembles credentials for the authorization request (wherein the credentials include at least one key) and provides the assembled credentials to participant 1.

When CAS 50 receives a second request including a portion of the assembled credentials from participant 1, the server validates the portion of the assembled credentials with the key that corresponds to the assembled credentials. This provides participant 1 access to purchase the account code. If the portion of the assembled credentials is not valid, then the request is declined. Otherwise, CAS 50 determines if the account code is equal to one of a plurality of valid account codes. When the account code is equal to one of the plurality of valid account codes, CAS 50 compares the purchase value to the monetary value that is associated with the account code to determine if the monetary value exceeds the purchase value. If the account code is not equal to one of the plurality of valid account codes or when the monetary value does not exceed the purchase value, the request is declined. When the monetary value exceeds the purchase value, CAS 50 sends a purchase authorization message authorizing the purchase transaction and subtracts the purchase value from the monetary value associated with the account code in order to obtain an updated monetary value, which is associated with the account code.

In accordance with one embodiment, the card provider system receives from a user via a second e-commerce website, an authorization request for an authorization of a purchase transaction. The authorization request is associated with an account code, which is issued by a first e-commerce web site for use on the second e-commerce website. The CAS 50 includes a database that is logically separated into a first subsection, a second subsection, a third subsection, and an object repository. Each of the subsections may be logically separated via a firewall.

The first subsection contains a high-level key class of objects and a first plurality of secondary classes of objects derived from the high-level key class of objects. Each of the first plurality of secondary classes of objects defines a business unit. The second subsection contains a high-level secondary class of objects and a second plurality of secondary classes of objects that are derived from the high-level secondary class of objects. Each of the second plurality of secondary classes of objects defines one of a plurality of transaction codes. The second plurality of secondary classes of objects inherits attributes from the high-level key class of objects. The third subsection contains a high-level intermediate class of objects and a third plurality of secondary classes of objects derived from the high-level intermediate class of objects. Each of the third plurality of secondary classes of objects may define a geographic region and a business sub-unit, for example. Each of the third plurality of secondary classes of objects inherits attributes from at least one of the high-level key class of objects and the high-level secondary class of objects.

The object repository includes a plurality of reusable classes from which the high-level key class of objects, the high-level intermediate class of objects, and the high-level secondary class of objects are derived. Each of the second plurality of secondary classes of objects is associated with one of the plurality of transaction codes.

The CAS 50 determines when the account code is equal to one of a plurality of valid account codes. When the account code is equal to one of the plurality of valid account codes, the CAS 50 compares the purchase value to the monetary value that is associated with the account code to determine if the monetary value exceeds the purchase value. If the monetary value exceeds the purchase value, the CAS 50 sends a purchase authorization message authorizing the purchase transaction and subtracts the purchase value from the monetary value that is associated with the account code.

Those of ordinary skill in the art will appreciate that the aforementioned embodiments may be implemented using any number of computing hardware and software. For example, a component of back end processing 10 may process account codes, rather than CAS 50 to determine when an account code is equal to one of a plurality of valid account codes.

The embodiment depicted in FIG. 13 allows the participant 1 to spend the loyalty points in at least two ways. First, the loyalty points can be deducted at the time of the transaction processing (e.g., during the initial request or during authorization); or second, the transaction may be reflected on the participant's 1 billing statement along with an associated credit that reflects the payment with loyalty points. It should also be appreciated, that a participant 1 may choose to use loyalty points on a transaction-by-transaction basis, and preferably, is able to combine variations of currency (e.g., credit, debit cards, etc.) and non-currency tender (loyalty points), as desired, to effectuate a transaction. Additionally, both currency and non-currency tender may be integrated into a STN gift product (where a first party gifts to a second party a STN that has some currency value derived from a loyalty account), or a STN stored value card (where the stored value card may be loaded with loyalty point-funded credit and used as a regular charge card).

Another STN embodiment is shown in FIG. 14. Here, the participant 1 is able to choose to use loyalty points when shopping at a merchant 5 site that supports the "pay with loyalty points" payment option. Referencing FIG. 14, the participant 1 goes to a participating merchant's site (e.g., online website) to shop for goods or services. The participant 1 selects merchandise and continues to a payment site, where the "pay with loyalty points" is one of the payment options (step 301). When the participant 1 selects this option, a secure connection is established with the account manager 10 that authenticates both the participant 1 and the merchant 5 (step 302). The account manager 10 may request the participant's username and password which is returned to the account manager 10 with the purchase amount (step 304). The user interface 20 (e.g., web server) causes the participant 1 to be authenticated, collects the associated transaction card account information and invokes the loyalty system middleware 40 (step 305). The loyalty system middleware 40 uses this card account information to identify the participant's 1 loyalty account (step 306). If none of the registered accounts are related to a loyalty account, the participant 1 is not able to use loyalty points to pay for her purchase and an error is returned to the participant 1. After identifying the loyalty account, the loyalty points available are converted to the corresponding currency value and compared to the purchase amount being requested. If the purchase amount is greater than the loyalty currency value, an error may be returned to the participant 1, or alternatively, may prompt the participant 1 to pay the remaining balance with a financial transaction card (step 307). In one embodiment, if the loyalty currency value is greater than the purchase amount, all transaction card accounts participating in or affiliated with the loyalty account are collected and returned to the participant (step 308). The participant 1 designates the financial transaction account to be used to host all succeeding financial activity, which is then returned to the account manager 10 (step 309). The account manager 10 then triggers the STN system 90 to establish a STN that is associated with the selected loyalty account and a loyalty-STN profile is set-up (step 310). The STN system 90 returns the STN to the user interface system 20 and then to the participant 1 (step 311). The participant 1 cuts and pastes, drags and drops, or auto-fills the STN (and other payment and delivery information) into the appropriate merchant payment fields (step 312).

As previously described, the merchant 5 uses the existing authorization network to request authorization for the STN transaction (step 313). The CAS 50 recognizes the transaction as one involving a STN and forwards to the STN service 90 (step 314). The STN service 90 identifies the associated financial transaction account for the STN (step 315) and also recognizes the account as associated with a loyalty account.

At this point, although the loyalty transactions would have been previously verified, in an exemplary embodiment, the loyalty account balance is again checked to minimize possible fraud (e.g., fraud involving two requests using the same loyalty points). The cash equivalent for the loyalty points is then retrieved from the loyalty system middleware 40 and if the purchase amount is greater than the available amount, a denial may be returned to the authorization system and to the merchant 5 (step 316). If the cash equivalent of the loyalty points exceeds the purchase amount, the STN system records the purchase in the loyalty-STN profile and returns the STN to the CAS 50 (step 317). The CAS 50 then completes the authorization for the financial transaction account (step 318), and returns the results (e.g., approval code) to the merchant 5 (step 319).

The approved transaction is finalized by the merchant 5 with the STN transaction being submitted through the existing POS network for settlement (step 320). As before, the transaction information is received by the FINCAP 60 (step 321) and then forwarded to the appropriate AP system 70 (step 322) for payment (step 323). Since the transaction involves a STN, FINCAP 60 directs the transaction to the STN service 90 to identify the associated transaction card account (step 324). The STN service 90 identifies the financial transaction account (step 325) and also recognizes that the STN account is associated with loyalty points, whereupon the STN service 90 searches the loyalty-STN profile for the associated purchase record (step 326). The STN system (i) passes a credit request to the loyalty system middleware 40 to reduce the loyalty points (step 326*a*), and (ii) creates a credit against the billing transaction (step 326*b*). In step 326*a*, the STN service 90 passes a request to the loyalty system middleware 40 to deduct the appropriate number of loyalty points. Here, it is not necessary to return the AR transaction information to FINCAP 60 for forwarding to the AR system 80, but a reconciliation entry is created to reconcile the accounts receivable for FINCAP 60. In step 326*b*, a transaction record is used to build a credit against a financial transaction account that will offset the charge transaction. The STN system 90 forwards this credit to FINACAP 60. The original bill transaction is returned to the FINCAP 60 to appear on the participant's 1 statement. The FINCAP 60 then forwards the charge transaction to the appropriate AR system for normal processing. The FINCAP 60 forwards the credit issued by the loyalty system middleware 40 to the appropriate AR system 80 for normal billing processing. Accordingly, the participant 1 will see on her statement a credit reflecting the currency value of the loyalty points used and a charge in the amount of the transaction.

As briefly described above, another embodiment of the present invention uses a stored value card or a smart card where the loyalty points are converted to a currency value and may either be posted to a stored value card account or downloaded to a smart card. In this embodiment, the stored value card functions as a debit card that that draws upon a balance maintained in the stored value card account. The stored value card functions as a debit card and is processed using existing banking systems where, upon use, the stored value card amount is debited by an appropriate amount. To reload or add currency value to the stored value account, a participant associates a stored value account with his loyalty account, and instructs the account manager to convert loyalty points to a currency value to be applied to the stored value card account.

It should be understood, however, that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method comprising:
  receiving, by a computer for converting loyalty points and through a webpage, a selection to apply said loyalty points as a monetary value to a first transaction, wherein said first transaction is a previously executed charge and appears on a billing statement including a plurality of transactions of previously executed charges;
  displaying, by said computer and through said webpage, a fillable form to provide transaction information in response to said selection from said participant to apply said loyalty points as said monetary value;
  receiving, by said computer, a first merchant name, a transaction account type, and a transaction amount level via said fillable form;
  identifying, by said computer, said first transaction based on said merchant name, said transaction account type, and said transaction amount level;
  performing, by said computer, an analysis of said first transaction identified in said fillable form to determine a conversion ratio based on a second merchant identifier, and said transaction account type;
  converting, by said computer, said loyalty points to a currency value, wherein said conversion is based on said conversion ratio;
  applying, by said computer in real time, said currency value as a credit for said first transaction to a financial account; and
  offsetting, by said computer and over said web interface and in real time, said previously executed charge with said currency value.

2. The method of claim 1, further comprising:
  receiving, by said computer, a payment authorization request related to an available credit for a full purchase amount of a first transaction, wherein said payment authorization request includes a first merchant identifier associated with a first merchant; and
  approving, by said computer, said payment authorization request for any of said full purchase amount up to said available credit associated with a transaction account code such that said first transaction is completed.

3. The method of claim 1, further comprising applying said currency value as a credit to at least one of a financial transaction account of a third party, a stored value account of a third party and an online digital wallet account of a third party.

4. The method of claim 3, further comprising the step of applying said currency value as a credit to at least one of a gift product and a secondary transaction number.

5. The method of claim 1, further comprising increasing, by said computer, a balance of loyalty points associated with a transaction account code to obtain an increased balance of loyalty points, subsequent to approving a payment authorization request, and based upon loyalty program rules for earning loyalty points.

6. The method of claim 1, further comprising providing, by said computer and over a web interface, said webpage disclosing said first transaction and said purchase amount in a first section of said webpage, and a balance of loyalty points in a second section of said webpage.

7. The method of claim 1, further comprising said webpage disclosing a device for enabling application of a currency value of at least a portion of said loyalty points to said purchase amount in a previously executed charge.

8. The method of claim 1, wherein said previously executed charge is provided in an online billing statement.

9. The method of claim 1, further comprising retrieving, by said computer, information from a loyalty program database, including an amount of at least a portion of said loyalty points accumulated.

10. The method of claim 1, further comprising increasing, by said computer and in real time, available credit based upon said offset of said previously executed charge.

11. The method of claim 1, wherein said financial account is stored on a second database system.

12. The method of claim 1, wherein an indicator of available credit is associated with said first transaction and comprises said first merchant name.

13. The method of claim 1, further comprising:
  presenting, by said computer, a first request to approve said conversion ratio subsequent to determining said conversion ratio;
  receiving, by said computer, an indicator of at least one of: an approval and disapproval of said conversion ratio from said participant; and
  submitting, by said computer, a revision to said conversion ratio in response to said indicator being a disapproval of said conversion ratio.

14. The method of claim 13, further comprising:
  receiving a second request, by said computer over a web interface and based on said approval of said conversion ratio, from said participant to convert said loyalty points already existing in said loyalty program database to said currency value using said conversion ratio;
  retrieving, by said computer in real time, said loyalty points from said loyalty program database system, wherein said loyalty points include points from a second merchant associated with the second merchant identifier, in response to receiving said second request.

15. The method of claim 1, further comprising:
  registering, at said computer, for the use of a loyalty program, wherein said loyalty program comprises a loyalty program database system;
  establishing, by said computer, a loyalty account, wherein loyalty account information is stored within said loyalty program database system; and
  authenticating, at said computer, the use of said loyalty program.

16. The method of claim 1, wherein said loyalty points are associated with a loyalty program which is operated by a third party.

17. A system comprising:
  a processor for converting loyalty points,
  a tangible, non-transitory memory configured to communicate with said processor,
  the tangible, non-transitory memory having instructions stored thereon that, in response to execution by said processor, cause said processor to perform operations comprising:
    receiving, by said processor and through a webpage, a selection to apply said loyalty points as a monetary value to a first transaction, wherein said first transaction is a previously executed charge and appears on a billing statement including a plurality of transactions of previously executed charges;

displaying, by said processor and through said webpage, a fillable form to provide transaction information in response to said selection from said participant to apply said loyalty points as said monetary value;

receiving, by said processor, a first merchant name, a transaction account type, and a transaction amount level via said finable form;

identifying, by said processor, said first transaction based on said merchant name, said transaction account type, and said transaction amount level;

performing, by said processor, an analysis of said first transaction identified in said fillable form to determine a conversion ratio based on a second merchant identifier, and said transaction account type;

converting, by said computer, said loyalty points to a currency value, wherein said conversion is based on said conversion ratio;

applying, by said processor in real time, said currency value as a credit for said first transaction to a financial account; and offsetting, by said processor and over said web interface and in real time, said previously executed charge with said currency value.

18. An article of manufacture including a non-transitory, tangible computer readable storage medium having instructions stored thereon that, in response to execution by a computer for converting loyalty points, cause said computer to perform operations comprising:

receiving, by said computer and through a webpage, a selection to apply said loyalty points as a monetary value to a first transaction, wherein said first transaction is a previously executed charge and appears on a billing statement including a plurality of transactions of previously executed charges;

displaying, by said computer and through said webpage, a fillable form to provide transaction information in response to said selection from said participant to apply said loyalty points as said monetary value;

receiving, by said computer, a first merchant name, a transaction account type, and a transaction amount level via said fillable form;

identifying, by said computer, said first transaction based on said merchant name, said transaction account type, and said transaction amount level;

performing, by said computer, an analysis of said first transaction identified in said tillable form to determine a conversion ratio based on a second merchant identifier, and said transaction account type;

converting, by said computer, said loyalty points to a currency value, wherein said conversion is based on said conversion ratio;

applying, by said computer in real time, said currency value as a credit for said first transaction to a financial account; and offsetting, by said computer and over said web interface and in real time, said previously executed charge with said currency value.

* * * * *